(12) United States Patent
Epstein, III et al.

(10) Patent No.: US 6,684,335 B1
(45) Date of Patent: Jan. 27, 2004

(54) RESISTANCE CELL ARCHITECTURE

(76) Inventors: Edwin A. Epstein, III, 5868 A-1 Westheimer, Suite 514, Houston, TX (US) 77057; Souk Souvannavong, 5868 A-1 Westheimer, Suite 514, Houston, TX (US) 77057; Chia-Sheng Lu, 3505 S. Nellis Blvd., #1042, Las Vegas, NV (US) 89121

( * ) Notice: Subject to any disclaimer, the term of this patent is extended or adjusted under 35 U.S.C. 154(b) by 0 days.

(21) Appl. No.: 09/377,277

(22) Filed: Aug. 19, 1999

(51) Int. Cl.⁷ .................. G06F 11/30; G06F 12/14; H04L 9/00; H04L 9/32; H04L 12/28
(52) U.S. Cl. .................. 713/201; 713/200; 370/256
(58) Field of Search ................. 713/201, 200

(56) References Cited

U.S. PATENT DOCUMENTS

| | | | |
|---|---|---|---|
| 4,998,279 A | 3/1991 | Weiss | 380/23 |
| 5,159,629 A | 10/1992 | Double et al. | 380/4 |
| 5,280,527 A | 1/1994 | Gullman et al. | 380/23 |
| 5,353,350 A | 10/1994 | Unsworth et al. | 380/3 |
| 5,432,850 A | 7/1995 | Rothenberg | 380/23 |
| 5,440,547 A * | 8/1995 | Easki et al. | 370/395.3 |
| 5,596,718 A | 1/1997 | Boebert et al. | 395/187.01 |
| 5,636,282 A | 6/1997 | Holmquist et al. | 380/25 |
| 5,778,071 A | 7/1998 | Caputo et al. | 380/25 |
| 5,790,670 A | 8/1998 | Bramlett | 380/52 |
| 5,815,252 A | 9/1998 | Price Francis | 356/71 |
| 5,878,142 A | 3/1999 | Caputo et al. | 380/25 |
| 5,905,859 A * | 5/1999 | Holloway et al. | 713/201 |
| 5,931,946 A * | 8/1999 | Terada et al. | 713/201 |
| 6,373,826 B1 * | 4/2002 | Russell et al. | 370/256 |

OTHER PUBLICATIONS

*A complete CEM detector system for vacuum use*, Electron And ION Detector Amptektron®, MD–501.
*Frequently Asked Questions*, Tellurex Corporation.
Hoover's Online: Hoover's Company Capsules.
*Cryptography: The Study of Encryption*, Copyright© Francis Litterio (2 pp.).
*What is cryptography?*, RSA Laboratories, Copyright © 1998 RSA Data Security, Inc. (18 pp.).

* cited by examiner

*Primary Examiner*—Gilberto Barron
*Assistant Examiner*—A. Nobahar
(74) *Attorney, Agent, or Firm*—Conley Rose, P.C.

(57) ABSTRACT

A communication network implements a "resistance cell architecture." Each cell in the architecture comprises communication equipment such as a cell communication device coupled to one or more computers or terminals. Each cell is only permitted to communicate directly with certain predetermined other cells in the architecture. If a cell has a communication to be transmitted to a cell to which it does not directly communicate, the communication will be sent from one cell to another until the communication reaches the intended recipient. A security breach in the network can quickly, easily and effectively be isolated using the resistance cell architecture. For example, once a security is detected, the cell through which the security intrusion is detected can be deactivated or destroyed thereby preventing communications from the infected cell or branch of the resistance cell architecture to reach other parts of the network. Various cells in the resistance cell architecture can act as master controlling cells of various other subordinate cells. Master cells control many functions and the communication behavior of their subordinate cells. A set of commands is made available to the administrators of the cells to initiate and configure the network. The commands includes a number of controls and sub-controls that permit the master cells to initiate subordinate cells into the resistance cell architecture, alter the operating characteristics of the architecture, and respond to detected security breaches and problems.

17 Claims, 8 Drawing Sheets

RESISTANCE CELL ARCHITECTURE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to network architecture. More particularly, the invention relates to an architecture that facilitates isolating security intrusions. Still more particularly, the invention relates to a computer architecture in which each node in the architecture can communicate with and be programmed by only certain other predetermined nodes.

2. Background of the Invention

Computer networks generally comprise a plurality of computers or terminals coupled together to form a cohesive group of machines that can easily communicate with one another. Generally, each computer in a network can communicate directly with each of the other computers in the network. In the context of publicly available networks such as the Internet, any computer linked to the Internet generally can access all other computers linked to the Internet.

Individuals or companies that operate computer networks often employ system administrators to manage the network. The system administrator generally has unique privileges, not available to the general population of users of the network, to permit effective administration of the network. For example, the system administrator will be able to add or delete user accounts to control who should have access to the network. The administrator will also be able to specify what privileges or access rights each user will have. Certain sensitive information can be protected by only permitting those users with a need to such information to be able to access such information. The administrator can configure all other users to prevent them accessing the sensitive information. Often, there are multiple administrators of a computer network. More than one administrator may be necessary particularly to keep up with network administration needs of larger networks and companies.

With the ease of information access in a computer network, security may be a problem. A company may have highly sensitive information for which security is extremely important. A few examples of sensitive information include payroll data, personnel data, and customer specific confidential information. Breaches in network security can arise from at least two sources—infiltration from an unauthorized outside person (e.g., a non-employee) or a corrupt or dishonest employee internal to the company. Once having access to the network, either person may be able to copy, print or email sensitive information, erase accessible data to sabotage the system or other undesirable actions. A dishonest system administrator can cause even more harm than a user. For example, an administrator can erase or reformat a hard drive, prevent authorized users from accessing certain files and directories, and other actions.

Quickly and effectively responding to a security breach is extremely important. The response to a security breach includes two basic tasks. First, the security breach must be detected. That is, the system or security administrator must be able to detect that someone or some entity is attempting to infiltrate the network. Second, the system administrator must minimize the potential harm the security breach may cause. To date, however, there have not been consistently quick and accurate methods to isolate a security breach and minimize the harm to the system.

Accordingly, it would be extremely desirable to have a computer network that can quickly, accurately and consistently isolate a security breach thereby preventing the unauthorized entity or person from causing additional harm to the rest of the computer network. Despite the desire for improved network security, to date the field still lacks adequate security measures.

BRIEF SUMMARY OF THE INVENTION

The problems noted above are solved in large part by a communication network implementing a "resistance cell architecture." Each cell in the architecture comprises communication equipment such as a cell communication device coupled to one or more computers or terminals. Each cell is only permitted to communicate directly with certain predetermined other cells in the architecture. If a cell has a communication to be transmitted to a cell to which it does not directly communicate, the communication will be sent from one cell to another until the communication reaches the intended recipient.

A security breach in the network can quickly, easily and effectively be isolated using the resistance cell architecture. For example, once the security intrusion (e.g., an unauthorized entity attempting to gain access the network) is detected, the cell through which the security intrusion is detected can be deactivated. Once deactivated, no transmissions from that infected cell or branch of the resistance cell architecture can reach other parts of the network. Alternatively, the infected cell or branch of the network can be ordered to self-destruct thereby providing additional security and assurance that the security breach is effectively eliminated.

Many cells in the resistance cell architecture can act as "masters" to other cells (called "subordinate" cells). Master cells control many functions and the communication behavior of their subordinate cells. A set of commands, including controls and sub-controls, permits the master cells to initiate subordinate cells into the resistance cell architecture, alter the operating characteristics of the architecture, respond to detected security breaches and problems, and permit administrators of master and subordinate cells to configure the administrator's cell.

Thus, the present invention comprises a combination of features and advantages that enable it to overcome the various problems of conventional computer networks. The various characteristics described above, as well as other features, will be readily apparent to those of ordinary skill in the art upon reading the following detailed description of the preferred embodiments of the invention, and by referring to the accompanying drawing.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

The term "direct communication" between two cells is intended to mean that the two cells can transmit information between each other without having to transmit the information to an intermediary cell. The term "indirect communication" is intended to refer to transmitting information from one cell to another cell but through a third cell. For example, cell A communicates with cell B. If cell B also communicates with cell C, cell A can transmit a communication to cell B which will then transmit it to cell C. Cell A thus is in direct communication with cell B and cell B is in direct communication with cell C. However, cells A and C indirectly communicate with each other through cell B.

DETAILED DESCRIPTION OF THE PREFERRED EMBODIMENTS

U.S. patent application Ser. No. 09/364,784 filed Jul. 30, 1999 entitled "Data Encryption and Secured Communication Across a Computer Network" is hereby incorporated by reference in its entirety.

U.S. patent application Ser. No. 09/360,787 filed Jul. 26, 1999 and entitled "Security System and Enclosure to Protect Data Contained Therein" is hereby incorporated by reference in its entirety.

Figure 1:
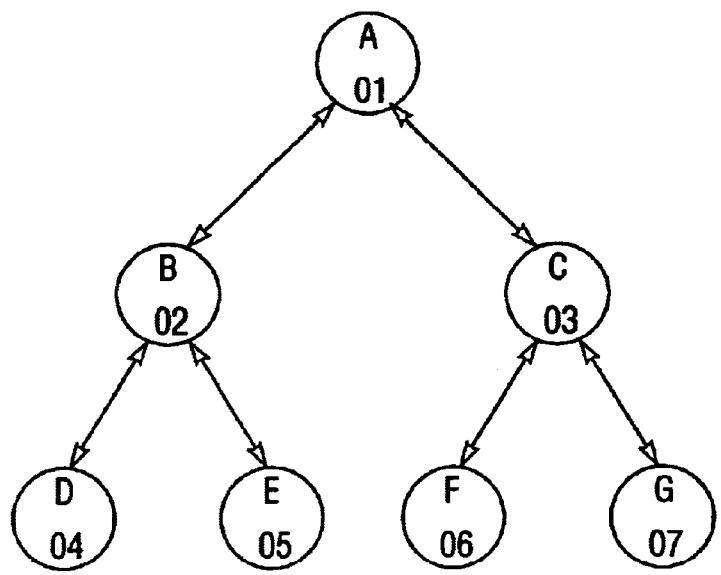
FIG. 1 shows an exemplary resistance cell architecture in accordance with the preferred embodiment.
Figure 2:
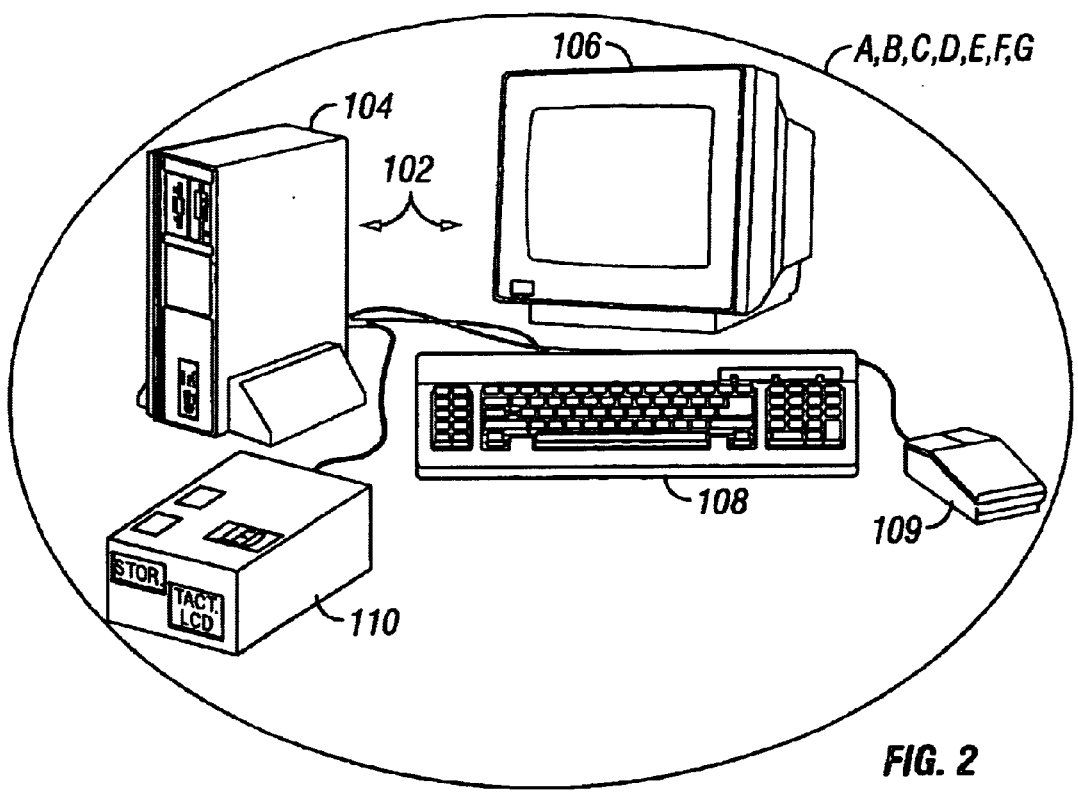
FIG. 2 shows an exemplary embodiment of a cell of the resistance architecture.

As shown in FIG. 1, an exemplary resistance cell architecture (also referred to as a resistance cell network) comprises a plurality of cells A–G. Each cell, as shown in FIG. 2, preferably includes a computer 102 and a cell communication device 110. The cell communication device couples the computer 102 to other cells in the network. A single computer 102 is shown in the exemplary cell of FIG. 2 for simplicity—in general, a cell can include any number of computers coupled to the cell communication device 110. Further, a cell can have other types of communication equipment, rather than or in addition to computer 102, such as terminals, personal data assistants ("PDAs"), pagers, etc.

Referring to FIG. 2, the cell communication device 110 of each cell A–G from FIG. 1 provides an interface between the computer 102 and the rest of the resistance cell network. The cell communication device includes many of the components of the data encryption device described in Ser. No. 09/364,784, filed Jul. 30, 1999 entitled "Data Encryption and Secured Communication Across a Computer Network." The name of the device has been changed from "data encryption device" in Ser. No. 09/364,784 to "cell communication device" to emphasize that data encryption and decryption is not a necessary function of the device, although if desired, the cell communication device 110 may include encryption functionality.

The computer 102 preferably includes a chassis 104, display 106, keyboard 108 and an input device 109 (e.g., a mouse). Most any personal computer will be sufficient.

The cell communication device 110 preferably is a separate component from the computer, but alternatively can be manufactured as one or more circuit cards to be inserted into computer 102. The cell communication device 110 preferably is connected to the computer chassis 104 via a cable. The device 110 includes a number of input/output devices such as a storage device, tactile LCD display, and LED display.

Figure 3:
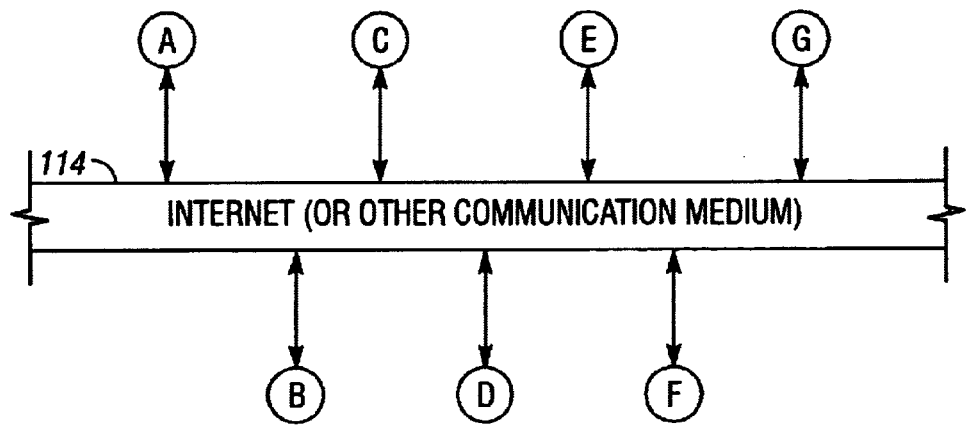
FIG. 3 shows an exemplary embodiment of the resistance cell architecture using the Internet as a communication medium between cells.

FIG. 1 is particularly useful to understanding the resistance cell architecture, but does not necessarily represent the physical interconnection of the various cells. Instead, FIG. 1 represents permissible communication pathways, as will be explained below. Each cell A–G in FIG. 1 has a numeral shown in the cell. As shown, the numerals include the integers 01–07. Each number represents an address of the computer included within the cell. If the resistance cell architecture is implemented using the Internet, each address preferably is an Internet Protocol ("IP") address, such as 129.65.127.1.0. FIG. 3 depicts the cells A–G of FIG. 1 coupled to a communication medium 114 such as the Internet. The connections to the Internet 114 may be through an Internet Service Provider ("ISP") (not shown) as is commonly understood. FIG. 3 thus represents a suitable physical connection for the cells in the resistance cell architecture.

Referring again to FIG. 1, the permissible communication pathways through the resistance cell architecture are shown by way of the arrows interconnecting the cells. As shown, cell A is permitted only to communicate directly with cells B and C. Cell B is permitted only to communicate directly with cells A, D, and E, while C is permitted only to communicate directly with cells A, F and G. Cells D and E only communicate directly with cell B, and cells F and G only communicate with cell C.

The architecture shown in FIG. 1 is a three-level resistance cell architecture—cell A is in the first level, cells B and C comprise the second level, and cells D–G comprise the third level. Further, each cell in the first and second levels (cells A, B, and C) couples to two cells in the next lower level. In addition, each cell in the network can be either a "master cell" or a "subordinate cell," or both. Master cells control their subordinate cells. Master cells are shown above their subordinate cells in the resistance cell architecture diagram of FIG. 1. For example, as shown cell A is a master to subordinate cells B and C. In addition to being a subordinate cell to master cell A, cell B is also a master of subordinate cells D and E. Thus, cell B is both a master with respect to cells D and E and a subordinate with respect to cell A. Similarly, cell C is the master cell for subordinates F and G. Thus, cell A is only a master, cells B and C are both masters and subordinates, and cells D–G are only subordinate cells.

The architecture shown in FIG. 1 represents only one possible architecture. If desired, additional cells can be added or one or more of the cells shown can be omitted. Further, each master cell can be a master to as many subordinate cells as is if desired. A master cell may only have a single subordinate if desired. Additionally, a resistance cell architecture can be implemented with only two levels of cells, or four or more levels.

A resistance cell architecture, such as that shown in FIG. 1, permits each cell to communicate directly with only certain predetermined other cells. For example, cell B can send a data message or command to cells A, D, or E, but not cells C, F, and G. Instead, if cell B wishes to transmit a message to cell G, that message must first be communicated to cell A. Cell A will then forward the message to cell C which, in turn, forwards the message on to the intended recipient cell G.

By limiting the permissible communication pathways for each cell, the resistance cell architecture provides an easy, fast and effective way to isolate a security intrusion. As will be explained below, any cell can be deactivated and eliminated from the resistance cell network. Once deactivated, no communications can be transmitted through the deactivated cell. For example, if an unauthorized intrusion is attempted into cell B, and the intrusion is detected, cell B can be deactivated, thereby precluding the unauthorized entity access to cells A, C, F, and G. Additionally, and again as will be explained below, the deactivation command for a cell may include a "cascade" option in which all cells below the deactivated cell will also be deactivated. Thus, an "infected" branch of the resistance cell architecture can quickly and effectively be taken off line precluding the intrusion from spreading to or accessing the rest of the network. For example, cell B can be deactivated, and with the cascade option, cells D and E also can be deactivated.

Cell Communication Device

FIGS. 4–14 show the cell communication device 110 in detail and will now be described. Afterwards, the command structure that creates and manages the resistance cell architecture will be described.

Figure 4:
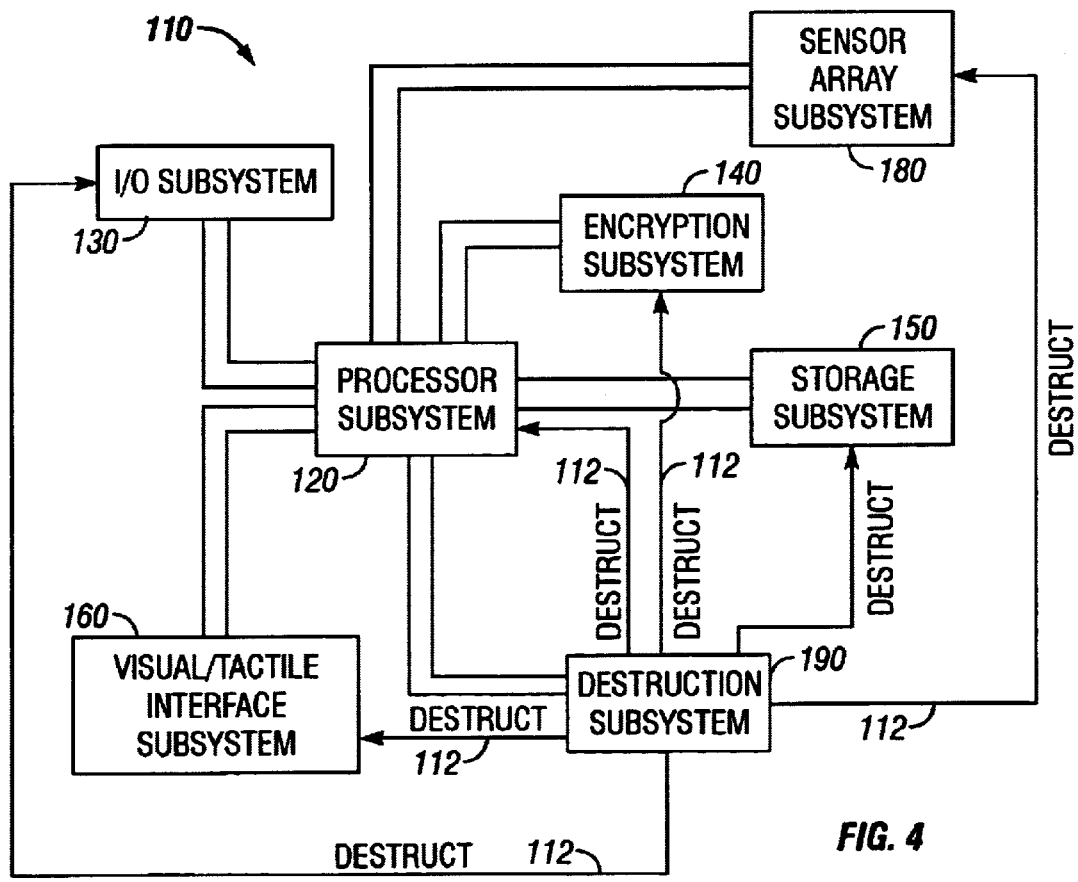
FIG. 4 is a block diagram of a cell communication device.

Referring first to FIG. 4, each cell communication device 110 preferably includes a processor subsystem 120, and input/output (I/O) subsystem 130, an encryption subsystem 140, a storage subsystem 150, a visual and tactile interface subsystem 160, a sensor array subsystem 180, and a destruction subsystem 190. The cell communication device 110 may include other components as well. A power supply and battery pack are exemplary of additional components not shown in FIG. 4. The embodiment shown in FIG. 4 is exemplary of only one embodiment of the cell communication device 110; many other embodiments and variations are possible and should be considered within the scope of the claims which follow this description.

The processor subsystem 120 performs a number of functions. One task, for example, is to monitor incoming transmissions from other cells in the resistance cell network and process those transmissions. This task will be explained below. Another task the processor subsystem 120 can perform, if desired, is to encrypt and decrypt data. Accordingly, the processor subsystem 120 cooperates with the encryption subsystem 140 to encrypt data or decrypted encrypted data received from another cell in the resistance cell network. The resistance cell architecture, however, does not require for communications transmitted from one cell to another to be encrypted, but it may be desired for increased security. The processor subsystem 120 will be described in further detail below in reference to FIG. 5.

Generally, the I/O subsystem 130 transmits communications to and receives communications from other cells in the resistance cell network and is described in further detail with reference to FIG. 6.

The encryption subsystem 140 facilitates the encryption and decryption of data. The encryption subsystem 140 can be any desired type of encryption logic and implement any encryption algorithms, such as those known to those of ordinary skill in the art. One suitable encryption technique is described in copending U.S. application Ser. No. 09/364,784, filed Jul. 30, 1999 and entitled "Data Encryption and Secured Communication Across a Computer Network." The encryption subsystem 140 is described below with reference to FIG. 7.

The storage subsystem 150 provides memory for storing information including various keys and matrices that may be used by the encryption process. The storage subsystem 150 also includes storage for incoming and outgoing transmissions to and from other cells in the resistance cell network. The storage subsystem 150 in a master cell also is used to store various parameters associated with that master cell's subordinate cells. The storage subsystem 150 will be described below with reference to FIG. 8.

The visual and tactile interface subsystem 160 provides a user interface to the data encryption device 110. Administrators and users of cell communication device 110 program the device through the visual and tactile interface subsystem. The visual and tactile interface subsystem also permits an administrator of a master cell to program its subordinate cells and initiate subordinate cells into the resistance cell architecture. Moreover, the command structure, described below, that implements the resistance cell architecture, is, to a large extent, implemented through the visual and tactile interface subsystem 160.

Additionally, the cell communication device 110 is programmed only through the visual and tactile interface subsystem 160, and cannot be programmed remotely by, for example, transmitting programming commands or instructions from the computers 102 coupled to the cell communication device 110 via the I/O subsystem 130. The visual and tactile interface subsystem 160 also includes biometric verification devices, such as a fingerprint scanner and a retinal scanner, to verify, if desired, the identity of a user or administrator before the device can be used, programmed or reprogrammed. By requiring direct physical contact with the data encryption device to use or program it, unauthorized personnel cannot defeat the security and encryption features the device 110 provides from a remote location on the Internet. The visual and tactile interface subsystem 160 is described below with respect to FIG. 9.

The sensor array subsystem 180 includes various types of environmental monitoring sensors, such as temperature, pressure and particle sensors. These sensors are used to detect attempts to tamper with the cell communication device 110. Any changes in these environmental conditions can be forwarded to that cell's master cell. Alternatively, or additionally, each master cell may continuously monitor the environmental parameters of each of its subordinate cells. A master, upon detecting an anomalous environmental condition for a subordinate, preferably takes appropriate action such as deactivating the subordinate cell, erasing the contents of the subordinate cell's memories, or even forcing the subordinate cell to destroy itself and all other cells subordinate to the destroyed subordinate. The sensor array subsystem 180 will be described below with respect to FIG. 10 and the tamper-proof aspects of the cell communication device 110 are further described with reference to FIGS. 12–14.

The destruction subsystem 180, which is optional, preferably "destroys" various selected other components of the cell communication device 110. The destruction subsystem 180 provides a DESTRUCT signal 112 to one or more of the other subsystems that preferably are destroyed in the event a security breach is detected. "Destroying" a component means physically damaging the target component in such a way to prevent that component from performing its intended function.

For example, once a data storage device, such as a ROM, is destroyed, the ROM is rendered unable to provide data stored therein. The destruction subsystem can be used to render the cell communication device 110 useless to anyone attempting to tamper with the device. Any sensitive data or software or other information or components stored in the cell communication device 110 can be destroyed to prevent it from falling into unintended hands. As described below and as an alternative to destroying various components of the cell communication device 110, select memory devices containing sensitive data and/or software can be erased.

Figure 5:
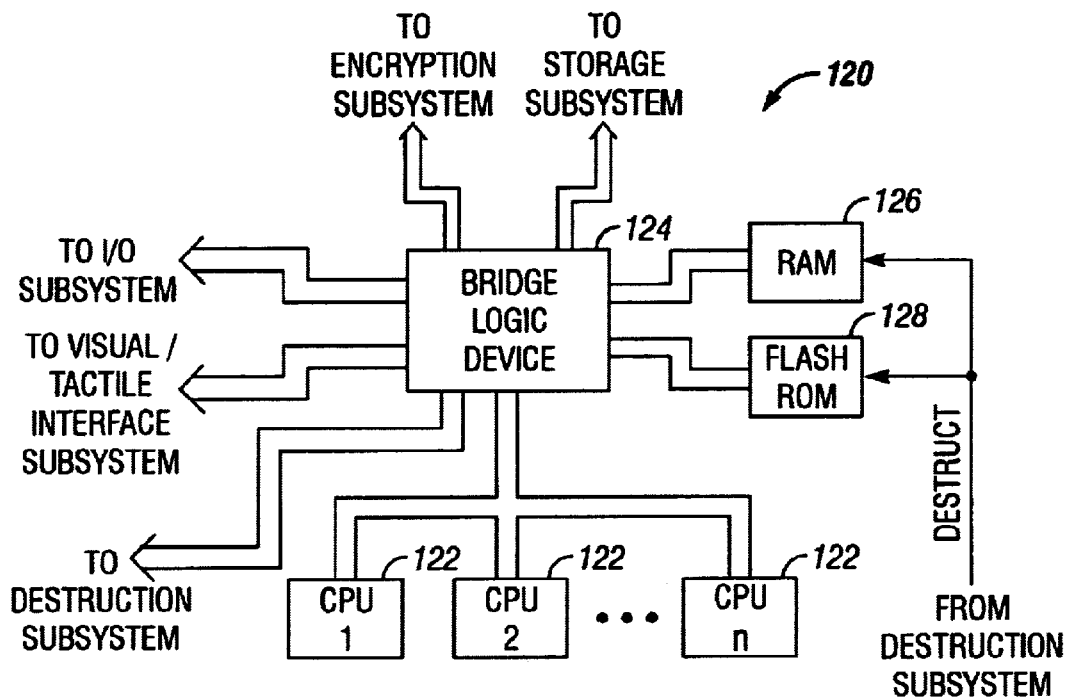
FIG. 5 is a block diagram of the processor subsystem of the cell communication device.

The various subsystems 120, 130, 140, 150, 160, 180, and 190 will now be described in greater detail with respect to FIGS. 5–11. Referring to FIG. 5, the processor subsystem 120 preferably comprises one or more central processing units ("CPUs") 122. Suitable CPU's 122 include the Pentium® family of processors from Intel, the SGI 128 manufactured by Silicon Graphics, Inc., or any other suitable CPU. Multiple CPUs may be included if it is desired to perform multi-tasking or parallel processing in accordance with known techniques to expedite processing throughout. Multi-tasking or parallel processing is particularly useful for encryption and decryption which are computationally intensive operations. Multiple CPUs also provide redundancy in the event one of the CPUs fail. A bridge logic device 124 may be included to facilitate communications between the CPU's 122 and the various busses to the I/O subsystem 130, the encryption subsystem 140, the storage subsystem 150, and the visual and tactile interface subsystem 160. The bridge logic device 124 may be a custom design or a suitable off-the-shelf part. The processor subsystem 120 preferably also includes random access memory ("RAM") 126 and flash read only memory ("ROM") 128 coupled to the CPUs 122 via bridge logic device 124. RAM memory is "volatile" memory which means its contents are lost if the device loses power. RAM memory preferably is used as the temporary scratch pad memory storage for the CPU's. RAM memory 126 may comprise any type of dynamic RAM ("DRAM") such as synchronous DRAM, or any other suitable type of memory. Flash ROM 128 is "non-volatile" memory which means it retains its contents even if power is turned off. Flash ROM 128 is used to store the software executed by the CPUs 122.

As shown, the RAM 126 and flash ROM 128 devices receive a DESTRUCT line from the destruction subsystem 190. The DESTRUCT line, when activated, will destroy the RAM 126 and ROM 128. If desired, the DESTRUCT line can be provided to other devices in the processor subsystem to destroy those devices as well.

Figure 6:
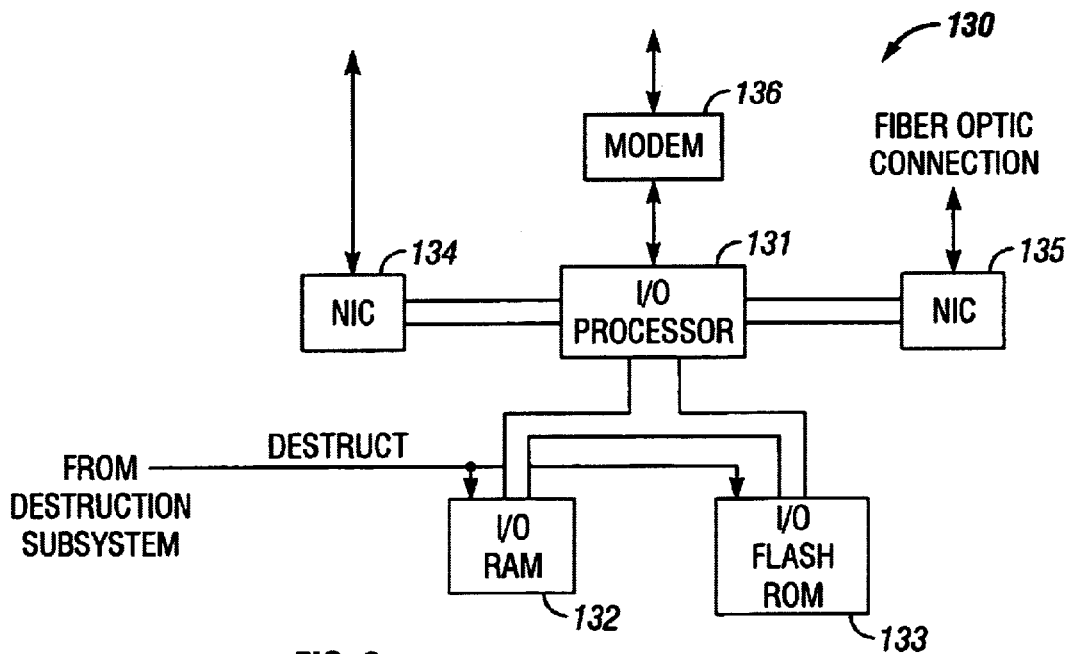
FIG. 6 is a block diagram of the input/output subsystem of the cell communication device.

Referring now to FIG. 6, the I/O subsystem 130 includes an I/O processor 131, I/O RAM 132, I/O flash ROM 133, a pair of network interface cards ("NICs") 134, 135 and a modem 136. The I/O processor 131 includes at least one CPU, and may include multiple CPUs if desired. The CPU preferably is a Pentium processor, a SGI 128 provided by Silicon Graphics, Inc., or other suitable type of CPU. The software executed by the processor 131 is stored in the flash ROM 133 and the processor uses the RAM 132 to temporarily store data it uses.

The I/O subsystem 130 of the cell communication device 110 preferably includes three interface connections. Two connections are provided via the two NICs 134, 135 and the third interface connection is provided via the modem 136. As such, the data encryption device 110 can be used to connect to a variety of communication media. For example, the data encryption device can be connected to a standard telephone line via modem 136 which may comprise any suitable internal modem. The NICs 134, 135 are used to transmit data across a local area network ("LAN") or wide area network ("WAN"). Preferably, the NIC 134 comprises an auto 10/100 BT NIC manufactured by 3 COM and is used to transmit data via twisted wire pairs across a LAN or WAN. NIC 135 comprises a Gigabit EtherLink® NIC manufactured by 3Com and is used to transmit data via fiber optics across a LAN or WAN. Any of these three I/O communications media can be used depending on the environment in which the data encryption device 110 is to operate. As will be explained below, a master cell can program a subordinate cell to use a particular interface connection.

As shown, the I/O RAM 132 and I/O flash ROM 133 devices receive the DESTRUCT line from the destruction subsystem 190. The DESTRUCT line, when activated, will destroy the RAM 132 and ROM 133. If desired, the DESTRUCT line can be provided to other devices in the I/O subsystem to destroy those devices as well.

Figure 7:
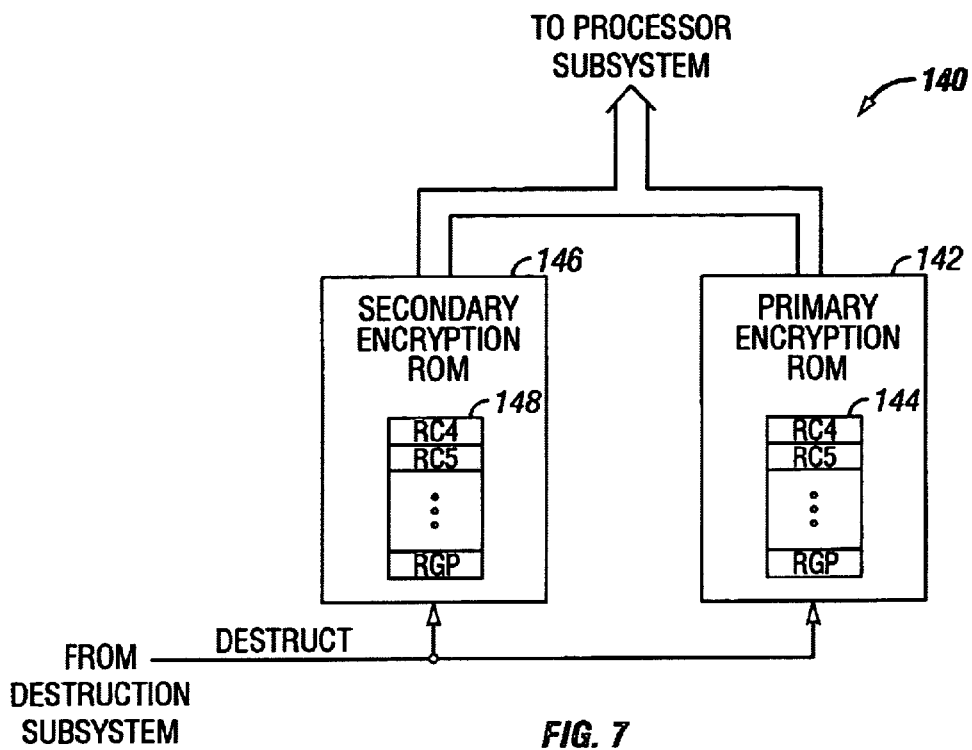
FIG. 7 is a block diagram of the encryption subsystem of the cell communication device.

Referring now to FIG. 7, the encryption subsystem 140 preferably comprises a primary encryption ROM 142 and a secondary encryption ROM 146. Each ROM 142, 146 preferably is a flash ROM memory device. The cell communication device 110 preferably incorporates the encryption technique described in copending application Ser. No. 09/364,784 filed Jul. 30, 1999 entitled "Data Encryption and Secured Communication Across a Computer Network." As described therein, the encryption technique uses one or more, and preferably multiple, encryption algorithms or a list of encryption algorithms that are used in the encryption and decryption process. These encryption algorithms are stored in encryption ROMs 142, 146, with each ROM preferably having an identical list. Preferably, one of the encryption techniques stored in encryption subsystem 140 is randomly selected to encrypt and decrypt data in a communication transmission from one cell communication device in one cell to another cell communication device in another cell. The next time data needs to be encrypted, such data preferably will be encrypted preferably using a different encryption technique randomly selected from encryption subsystem 140. Accordingly, the data encryption device 110 encrypts various blocks of data according to dynamically varying encryption techniques making cryptanalysis difficult.

The number of encryption algorithms stored in buffers 144, 148 can be any desired number and type. The more encryption algorithms that are provided in buffers 144, 148 generally makes the encrypted data more secure. In accordance with the preferred embodiment, the buffers 144, 148 include the following encryption algorithms: RC4, RC5, TripleDES, and Pretty Good Protection ("PGP"). Preferably, the buffers 144, 148 contain identical lists of encryption algorithms and in the same order. The encryption algorithms are reciprocal meaning that each algorithm can be used to encrypt data and decrypt the encrypted data. The encryption algorithms themselves preferably are stored in the processor subsystem 120 and executed by CPUs 122.

The processor subsystem 120 can select an encryption algorithm from either buffer 144 in the primary encryption ROM 142 or buffer 148 in the secondary encryption ROM 146, but will normally select the encryption algorithm from buffer 144 in the primary encryption ROM 142. The secondary encryption ROM 146 is included for redundancy in the event the primary encryption ROM 142 fails. Accordingly, if the primary encryption ROM fails, the processor subsystem 120 will select the encryption algorithms from the buffer 148 of the secondary encryption ROM 146.

As shown, the encryption ROMs 142 and 146 receive the DESTRUCT line from the destruction subsystem 190. The DESTRUCT line, when activated, will destroy the ROMs 142, 146.

Figure 8:
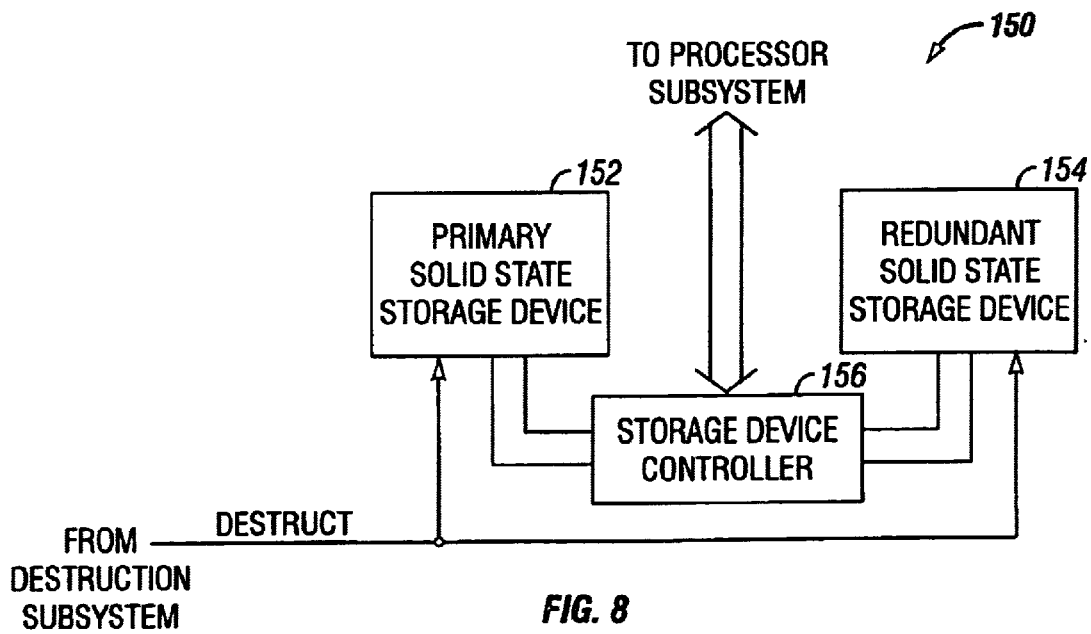
FIG. 8 is a block diagram of the storage subsystem of the cell communication device.

Referring to FIG. 8, the storage subsystem 150 preferably includes a primary solid state storage device 152, a secondary solid state storage device 154 and a storage device controller 156 coupled to both storage devices 152, 154. The solid state storage devices 152, 154 preferably comprise any suitable type of solid state storage device. Although other types of storage media can be used such as conventional hard drives, solid state storage devices are preferred because, without moving parts, a solid state storage device is extremely reliable and uses relatively little power. A suitable exemplary storage device is the E-Disk SFW35 disk provided by BiT Microsystems. Each E-Disk SFW35 can hold approximately 9 gigabytes of data and draws less than one ampere of current from a 5 VDC source (power consumption less than 5 watts).

Various pieces of information are stored in the solid state storage devices 152, 154. Preferably, the data contained in both devices 152, 154 is identical. Data coherency between storage devices is insured by controller 156. Thus, if the primary storage device 152 fails, the processor subsystem 120 can simply use the secondary storage device 154. The information stored in the storage devices 152, 154 preferably includes various "keys" and buffers used by the encryption and decryption processes. Also, biometric information such as a person's retinal and fingerprint templates can be stored in the storage device 152, 154 and used to verify and authenticate a user or administrator. The buffers in storage devices 152, 154 preferably also are used to temporarily store communications to and from the cell communication device's associated computer or computers and other cell communication devices in other cells in the resistance cell network Referring now to FIG. 9, the visual and tactile interface ("VTI") subsystem 160 is controlled by a VTI processor 162, which preferably is a Pentium or SGI 128 processor. VTI processor 162 couples to a light emitting diode ("LED") display 166 and a tactile liquid crystal display ("LCD") panel 164 through a VTI controller 165. The tactile LCD display 164 can be any suitable touch sensitive device such as the Near Field Imaging™ Touch Screen System from Dynapro. The tactile LCD display permits a user, such as a system administrator, to use and program the data encryption device 110. The LED display 166 preferably is any suitable LED display and may simply include a plurality of status LEDs. The LED display 166 preferably is used to display status information regarding a communication process.

The VTI controller 165, preferably receives display data from the processor 162 over a bus. The VTI processor 162 requests the VTI controller 165 to display the data or graphics images on the tactile LCD panel 164 and/or the LED display 166. In response, the VTI controller 165 generates appropriate control signals to the tactile LCD panel 164 and/or LED display 166 to display the requested data from the VTI processor 162. The VTI controller 165 also receives input signals from the tactile LCD panel 164 in response to user input via its touch sensitive screen.

The VTI processor 162 couples to RAM 171 and flash ROM 167. As noted above in other subsystems, RAM 171 provides a temporary storage facility for the processor 162 and flash ROM 167 stores the software executed by the processor 162.

The VTI processor 162 also couples to one or more biometric scanning devices. In accordance with the preferred embodiment of the invention, the visual and tactile interface subsystem 160 includes both a fingerprint scanner 172 and retinal scanner 174 which couple to the VTI processor 162 via biometric controller 176. The fingerprint scanner 172, which preferably is a Touchlock II manufactured by Identics, scans and records an image of a person's fingerprint which is then provided to the controller 176 and then to the VTI processor 162 for verification. The retinal scanner, which preferably is an Eyedentifier Retinal Biometric Reader manufactured by Rayco Security, scans and records an image of a person's retina. The scanned retinal image is provided to the VTI processor 162 via the biometric controller 176 for verification.

Preferably, user verification requires both the fingerprint and the retinal scan to match prerecorded fingerprint and retina templates 161 stored in the storage subsystem 150 and provided to the VTI processor 172. Scanning and verification of fingerprints and retinal images preferably is in accordance with known techniques such as those described in U.S. Pat. Nos. 5,280,527 and 5,815,252, both of which are incorporated herein by reference in their entirety. A user, such as a system administrator, cannot program the data encryption device 110 unless that person passes the biometric verification process and, as explained below, provides the correct personal identification number to the device. This personal verification process provides increased security for the data encryption device 110 to protect it from unauthorized access and programming.

Figure 9:
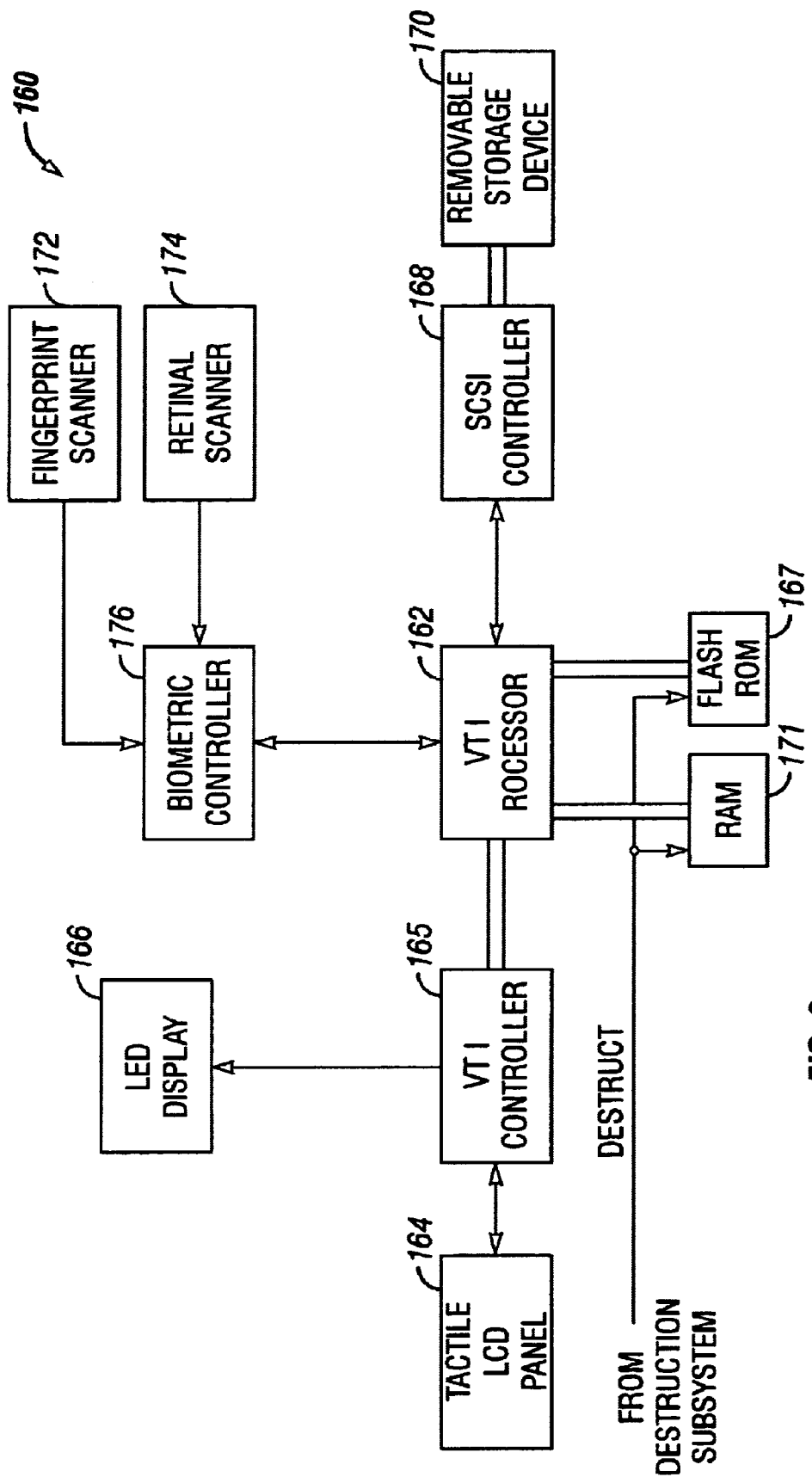
FIG. 9 is a block diagram of the visual/tactile interface subsystem of the cell communication device.

Referring still to FIG. 9, the removable storage device 170 preferably comprises any suitable type of storage device such as a CLIK!™ drive provided by Iomega Corp. The storage device 170 preferably includes removable disks or other types of storage media. Removable storage device 170 preferably is used to store security initiation disk information (explained below) which is used to initiate subordinate cells in the resistance cell architecture and to store event log entries such as attempted logons etc.

Figure 10:
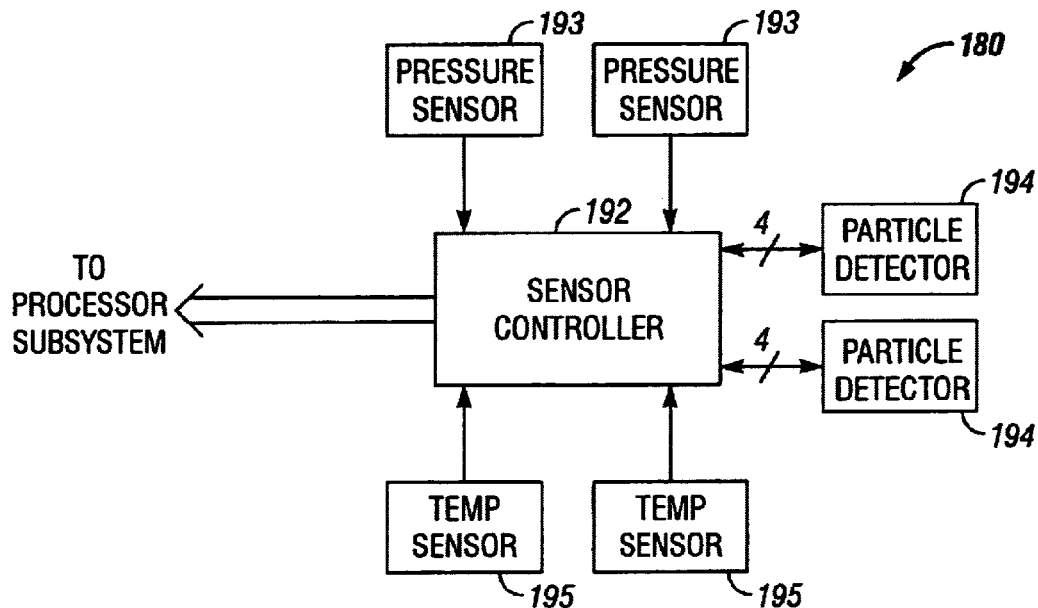
FIG. 10 is a block diagram of the sensor array subsystem of the cell communication device.

Referring now to FIG. 10, the sensor array subsystem 180 preferably includes a sensor controller 192 coupled to a plurality of sensors 193, 194, and 195. Sensors 193 include pressure sensors. Sensors 194 include particle detectors 194 that are highly sensitive devices that can detect the presence of particles such as electrons, ions, VUV, soft x-rays, and other nuclear or high energy particles, in a vacuum environment. The MD-501 Channel Electron Multiplier Electron and Ion Detector available from AMPTEKTRON is a suitable particle detector. The particle detector 194 preferably can detect the presence of even a single particle in a vacuum pressure, for example, less than 1×10E-4 torr. The MD-501 particle detector 194 has four electrical connections to the sensor controller 192. Power supply voltage and ground are provided to two connections to provide suitable operating power for the device. The output signal from the device is a pulse output signal which preferably is provided to a counter or ratemeter included in sensor controller 192 which computes the frequency or density of particles that enter the sensor.

Sensors 195 include temperature sensors, such as thermistors, and can be mounted to monitor the cell communication device's external temperature and internal temperature. Any detected change in temperature may be indicative of movement of the cell communication device 110 (e.g., attempted theft). The device 110 preferably reports this condition to its master cell which will take appropriate action such as cell deactivation, cell erasure, or cell destruction.

As explained below regarding FIGS. 12–14, the cell communication device includes an internal vacuum zone surrounding certain sensitive components, such as ROMs containing sensitive data or software. Any attempt to take the device apart or drill into the interior of the cell communication device will breach the protective vacuum and will be detected by the pressure transducers as a change in pressure. Additionally, changes in particle density may also be indicative of attempts by someone to penetrate the interior of the device and will be detected by particle detectors 193.

The sensor controller 192 monitors the environmental conditions experienced by the cell communication device 110 and provides the environmental condition data to the processor subsystem 120 which preferably then forwards the information through the I/O subsystem 130 to its master cell. If a master cell detects an anomalous condition in one of its subordinate cells (e.g., change in pressure, particle density, temperature), the master cell takes appropriate action. That action may include deactivating the subordinate cell's cell communication device, erasing some or all memory devices in the subordinate cell's cell communication device 110 or forcing the subordinate cell's destruction subsystem 190 to destroy various of its components.

As shown, more than one of each sensor type is included, although only one of each sensor type can be included if desired. Multiple sensors of each type may be preferable for redundancy in the event a sensor malfunctions. Further, one of the temperature sensors 195 may be mounted on an exterior surface of the cell communication device 110 to monitor external temperature, while the other temperature sensor 195 can be mounted on an interior surface to monitor the device's internal temperature. The pressure sensors 193 and particle detectors 194 preferably monitor the pressure and particle density of the vacuum region as described below in FIGS. 12–14.

Figure 11:
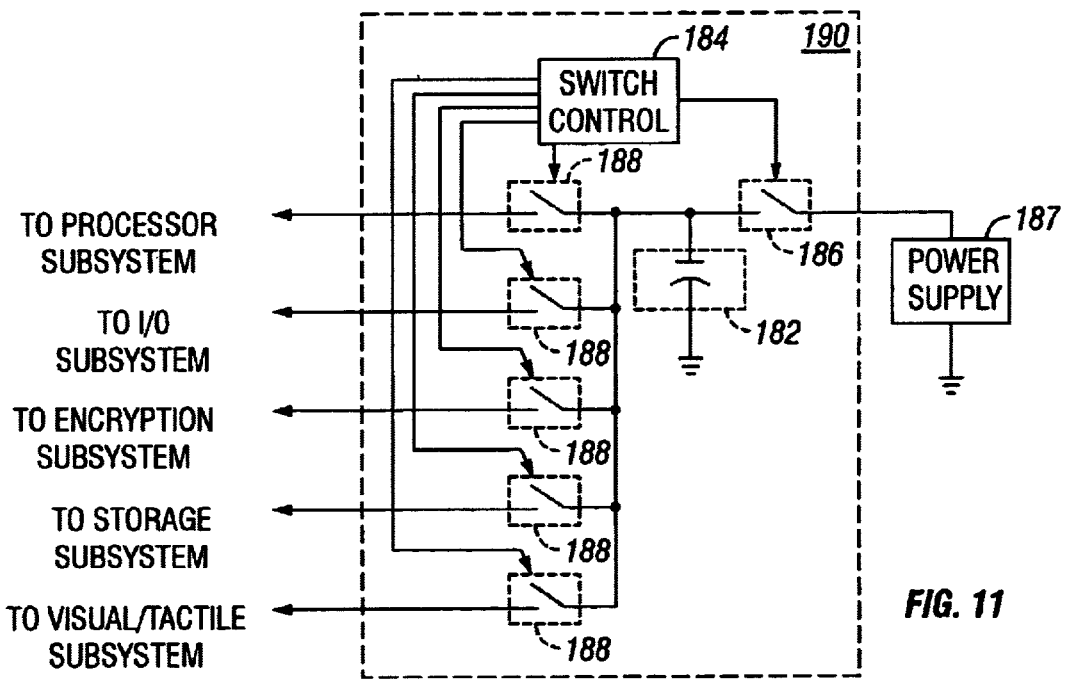
FIG. 11 is a block diagram of the destruction subsystem of the cell communication device.

Referring now to FIG. 11, destruction subsystem 190 preferably includes an energy storage device 182 and one or more switches 186 and 188 controlled by switch control 184. A power supply 187, which may be a component separate from the destruction subsystem 190, couples to switch 186.

The energy storage device 182 preferably comprises a capacitor as shown or any other suitable device, such as a 1 Farad capacitor that can store electrical energy. The switch control 184 charges capacitor 182 by closing switch 186 and opening switches 188. The capacitor 182 stores a relatively large amount of electrical energy provided to it by power supply 187. The amount of electrical energy stored in capacitor 182 is large enough to destroy any component connected to the capacitor when the capacitor discharges its energy load. The capacitor thus provides a power surge to all components that are desired to be destroyed. Upon detection of a predetermined security event, such as an attempt by someone to tamper with the structure of the cell communication device (detected by sensor array subsystem 180), an unauthorized person attempting to infiltrate the resistance cell architecture or an existing user or administrator acting improperly, the switch control 184 closes switches 188 thereby permitting capacitor 182 to discharge through switches 188 to the associated subsystems.

In accordance with the preferred embodiment shown in FIG. 11, the capacitor 182 connects to the various subsystems via the DETECT lines through a plurality of switches 188 independently controlled by switch control 184. Providing separate and independently controllable switches for each subsystem permits the destruction subsystem 190 to destroy select subsystems without destroying others. Alternatively, a single switch 188 can be provided to couple the capacitor 182 to the various other subsystems. The size of the capacitor will depend on the number of components to be destroyed by the capacitor as should be understood by one of ordinary skill in the art.

Figure 12:
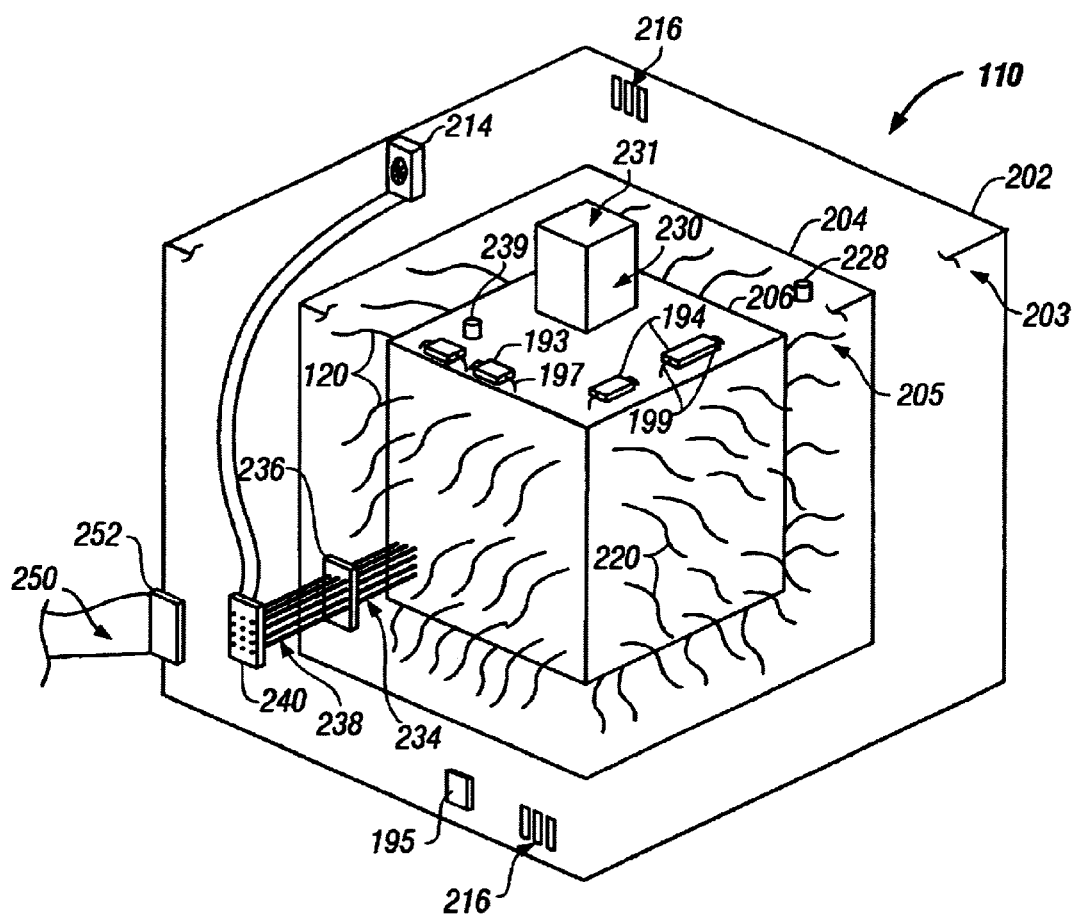
FIG. 12 is a perspective view of the cell communication device in accordance with the preferred embodiment.
Figure 13:
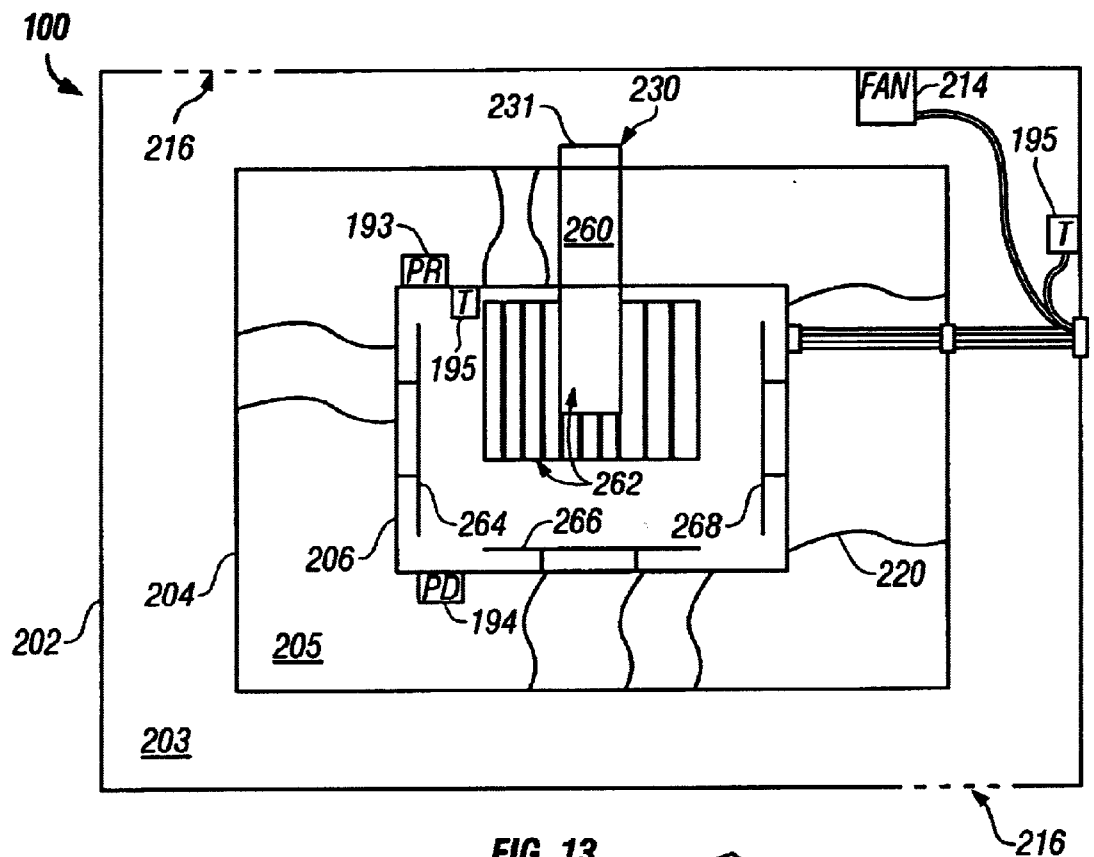
FIG. 13 is a cross-sectional view of the cell communication device.
Figure 14:
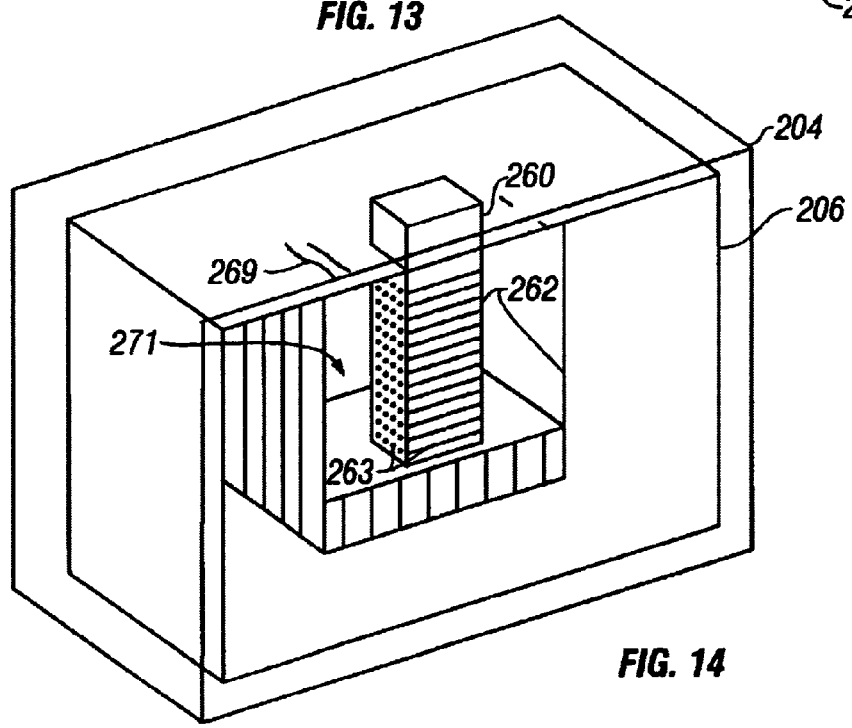
FIG. 14 shows the bores formed in a heat sink attached to the enclosure of FIG. 1.

FIGS. 12–14 show the mechanical layout of the cell communication device 110 in accordance with the preferred embodiment. Referring first to FIG. 12, each cell communication device 110 preferably includes an outer housing 202 and two inner housings 204 and 206. As shown, a first inner housing 206 (the inner-most housing) resides within the volume defined by second inner housing 204. Second inner housing 204 resides within the volume defined by outer housing 202. First inner housing 206 contains most of the electrical components shown in FIGS. 4–11. The pressure sensors 193 and particle detectors 194 are mounted on an exterior surface of the first inner housing 206. At least one temperature sensor 195 is mounted on an exterior surface of outer housing 202. Other temperature sensors may be included inside first inner housing 206. Cell communication device 110 includes various security features to detect any attempt to gain access to, or otherwise tamper with, the area inside the first inner housing 206 that contains sensitive data or software or sensitive information or devices.

In addition to the electronics shown and described above with reference to FIGS. 4–11, cell communication device 110 preferably also includes a fan 214, a plurality of support structures 220, and a heat removal element 230. An external electrical connection can be made to cell communication device 110 via a cable 250 having a connector 252 that mates with a corresponding connector 240 on an exterior surface of outer housing 202. A plurality of electrical and/or fiber optic conductors 238 connect housing connector 240 to second inner housing connector 236 which, in turn, connects to first inner housing 206 via conductors 234. Alternatively, conductors 238 may pass straight through second inner housing 206 to first inner housing without the use of connector 236.

The pressure transducers 193 preferably connect electrically via conductors 197 to the sensor array subsystem 180 shown in FIG. 11 and contained in first inner housing 206. Similarly, particle detectors 194 also connect electrically via conductors 199 to the sensor array subsystem 180 in first inner housing 206.

Referring still to FIG. 12, first inner housing 206 preferably is supported within second inner housing 204 by a plurality of support structures 220. The purpose of support structures 220 is to "suspend" first inner housing 206 inside second inner housing 204 to thereby permit a vacuum to surround all surfaces of the first inner housing 206. The vacuum is a security feature that is explained below. The support structures preferably are hollow curved tubes as shown, but alternatively can have other curved shapes or be straight if desired.

In accordance with the preferred embodiment, the interstitial volume 205 between the two inner housings 204, 206 is evacuated. That is, a vacuum exists in interstitial volume 205. By "vacuum" it is meant that the pressure of the interstitial volume 205 is less than 10% of ambient air pressure, and more preferably less than 1 torr. Because the support structures 220 effectively suspend the first inner housing 206 inside the second inner housing 204, the vacuum surrounds all sides or surfaces of the first inner housing 206, effectively encapsulating the first inner housing 206. The pressure transducers 193, which are exposed to the vacuum, are used to monitor the pressure of interstitial volume 205 and can detect any attempt to gain access to first inner housing 206. For example, a person might try to drill through housings 202 and 204 in an attempt to take apart the housings 202, 204 or attempt to pierce the first inner housing 206 in order to insert an electronic probe or camera into first inner housing 206 to examine the contents thereof The moment housings 202 and 204 are disturbed (e.g., removed) or the drill tip pierces the second inner housing 204, however, the vacuum of interstitial volume 205 will be breached and one or more of the pressure transducers will detect the change in pressure and preferably report this condition to the master cell which will respond appropriately.

The vacuum preferably is created during manufacturing through any suitable procedure. For example, a vacuum pump can be attached to port 228, which preferably is a check valve, and the gases initially contained in interstitial volume 205 can be pumped out. The resulting pressure of the vacuum preferably is less than 10% of ambient pressure, and preferably less than 1 torr. Lower pressures can be achieved, but the cost of creating such vacuums may increase and there may not be a substantial added benefit from greater vacuums (i.e., lower pressure).

Both the first and second inner housings 204, 206 comprise sealed structures sufficient to maintain the vacuum pressure. In accordance with the preferred embodiment, first inner housing 106 is constructed from metal, ceramic titanium, durable plastic, or any other material with sufficient stress resistance to withstand the pressure differential created by the vacuum. Second inner housing 204 preferably also is constructed from metal, ceramic titanium, durable plastic or other material with sufficient stress resistance to withstand the pressure differential created by the vacuum. The connector 236 preferably is sealed to maintain the vacuum in interstitial volume 205. Connector 236 is sealed preferably using a sealing compound such as ceramic titanium or other suitable sealing arrangement. The electrical conductors 234 pass through or mate with connector 236 mounted or formed in a side surface of the first inner housing 206. Connector 236 also is sealed using a conventional sealing arrangement to maintain the vacuum of interstitial volume 205.

The pressure transducers 193 provide a mechanism for the cell communication device 110 to detect when the vacuum of interstitial volume 205 is breached. If, however, the cell communication device 110 was placed in a vacuum chamber that matches the vacuum pressure of the interstitial volume 205, it may be possible for the pressure transducers 193 to fail to detect a change in pressure as there may not be a pressure gradient between interstitial volume 205 and the outside of the cell communication device 110.

To avoid this potential problem, the cell communication device 10 includes the particle detectors 194. It generally is very difficult, if not impossible, to achieve a perfect vacuum (i.e., 0 torr) in interstitial volume 205. Further, purer vacuums (i.e., vacuums with lower pressure) generally are more expensive to create than higher pressure vacuums. Accordingly, even if possible, it may not be desirable to have a perfect vacuum in interstitial volume 205. Thus, interstitial volume 205 generally includes one or more particles of oxygen, nitrogen, carbon dioxide, carbon monoxide, or any other gas or air-borne contaminants. That is, there will be at least a few detectable particles, albeit not many.

The particle detectors 194 preferably are sensitive enough to detect these particles and detect changes in the number of particles per unit volume of space. If a vacuum pressure could be created to surround the security system 100 and match the vacuum pressure of the interstitial volume 205, there will still be a change in particle density if someone was to drill through the second inner housing 204 into the interstitial volume 205. Although this change in particle density will be transient (i.e., temporary) until the particle density equilibrates in and around the cell communication device 110, the particle detectors 194 will detect this transient condition which will be reported to the master cell.

Referring still to FIG. 12 and as noted above, the interstitial volume with its vacuum functions as protective "moat" surrounding the information contained in the first inner housing 206. A side effect of the vacuum is that it also thermally insulates the first inner housing 206 and the electronics contained therein. Thus, any heat generated by the electronics in the first inner housing will remain in the first inner housing and potentially damage the electronics unless the heat is removed. Accordingly, a heat removal system 230 is included to conduct the heat away from the first inner housing 206 onto the top surface 231 of the heat removal system 230. The fan 214 blows air across top surface 231, which will be warm or hot from the heat generated by the electronics in the first inner housing 206, and out vents 216 to the outside environment. The heat removal system 230 is shown better in FIG. 13 and will be described further below.

Referring now to the cross-sectional view of FIG. 13 heat removal system 230 preferably comprises thermoelectric material 260 (referred to hereinafter as a "thermoelectric device") and a heat conductor 262. The heat conductor 262 thermally couples to one or more circuit boards or modules 264, 266, 268 to receive the heat generated by electronics mounted on the circuit boards. The circuit boards 264, 266, 268 include the circuitry shown in FIGS. 4–11 mounted thereon. Fewer than or more than three circuit boards may be needed or desired to accommodate the circuitry of the cell communication device 110. The heat collected by the heat conductor is provided to the thermoelectric device. In accordance with the preferred embodiment, the circuit boards or electronics contained thereon do not necessarily connect directly to heat conductor 262, although a direct thermal connection to the heat conductor 262 is acceptable. Instead, first inner housing 206 is pressurized with a suitable gas, such as helium, to provide an adequate thermal conduction or radiation path from the electronics to the heat conductor 262. The gas is injected during manufacturing through port 239, which preferably comprises a check valve. Other methods for injecting helium into the first inner housing 206 while preventing the helium from exiting into the interstitial volume 205 are also acceptable. A suitable gas is helium as it has a relatively high heat capacity, 5.23 joules per gram, and is non-flammable so it is safe. Preferably, the pressure of helium in the first inner housing 206 is approximately 200 atmospheres, although the pressure can be varied as desired. Preferably, no water vapor is present inside the first inner housing 206 to prevent corrosion of the electrical components contained therein. To prevent the presence or build-up of water vapor, any well known desiccant can be included in the first inner housing 206.

The thermoelectric device 260 preferably consists of a semiconductor material, such as bismuth telluride, separating two dissimilar conductors. A voltage is applied to the device and, in accordance with the Peltier effect, known to those of ordinary skill in the art, the voltage causes the thermal electric device to move or "pump" heat from one end of the device to the other end. The direction in which the heat is pumped through the device can be reversed by reversing the polarity of the applied voltage. Suitable thermal electric devices are available from Tellurex Corporation, Traverse City, Mich.

Thus, an electrical voltage is provided from electronics in the first inner housing 206 to the thermal electric device to pump heat generate in the inner housing to the outside. If, however, the cell communication device 110 is operated in an environment colder than the heat generated by the electronics, it may be necessary to warm the electronics. The electronics can be warmed by reversing the polarity of the voltage provided to the thermal electric device 260 to reverse the direction of heat flow through the device.

Another benefit of thermoelectric material is that although in accordance with the Peltier effect, the material can pump heat, in accordance with the Seebeck effect, the material also can generate electrical current when the material is exposed to a temperature gradient. Thus, electrical energy generated by the thermoelectric device 260 can be used by recharging circuitry in the power supply 187 (FIG. 10) to recharge batteries (not specifically shown) if rechargeable batteries are included in the cell communication device 110.

If the thermoelectric device 260 and heat conductor 262 comprised solid material, it might be possible for someone to drill through these materials to gain access to the inner volume of first inner housing 205. Someone could insert an electronic probe through such a hole in the materials comprising heat removal system 230 to retrieve the data to be protected, thereby defeating the security features of the cell communication device 110. The heat conductor 262, however, is constructed in such a way to prevent this from happening. Referring to FIG. 14, the heat conductor 262, as shown, preferably comprises a plurality of bores 263 drilled therethrough. The bores are arranged sufficiently close together or in any other way that it would be difficult, if not impossible, to drill through the thermoelectric device 260 and through the heat conductor 262 without the drilling device puncturing or otherwise entering one or more of the bores 263. The volume 271 formed by the heat conductor shares the vacuum formed in the interstitial space via slits 269. Once a bore cavity is punctured, the vacuum of the interstitial volume will be breached, one or more of the pressure sensors 193 will detect a change in pressure and the cell communication device 110 will take appropriate action as explained below.

Resistance Cell Architecture Commands

The following discussion describes the implementation of the resistance cell architecture with references being made to FIGS. 1–4. The permissible communication pathways of the resistance cell architecture (e.g., the pathways shown in the exemplary architecture of FIG. 1) are specified through the administration of each cell and the through the initialization of a subordinate cell by a master cell. Various commands, referred to as "controls" and "sub-controls" in this description, are used to specify the permissible communication pathways, as well as other functions. A master cell can incorporate one or more subordinate cells into the resistance cell architecture and specify to the subordinate cell which cell is its master. The subordinate cell, in turn, can itself become a master and bring other subordinate cells into the network. At that point, the direct communication pathways for the cell are set and the cell can only transmit communications to those cells (i.e., the cells in direct communication). Communications intended for any other cell in the network must first be transmitted to a cell that is in direct communication with the sending cell.

Referring to FIG. 1, for example, master cell A can initiate subordinate cell B into the network. Once initiated into the network, cell B only communicates with its master (cell A). Cell B, however, can become a master itself and initiate subordinate cells D and E into the network. At that point, cell B can only transmit communications to cells A, D, and E. Any communication intended for cells C, F or G must first be transmitted by cell B to cell A.

In accordance with the preferred embodiment, a suitable user and administrator hierarchy is implemented in the resistance cell architecture. In addition to being controlled by a master cell, each cell communication device 110 can be programmed and controlled, to a limited extent, by a plurality of its own administrators and users. Various levels of administrators and users can be defined according to various security levels. Persons with higher security levels can, for example, add, modify, and delete users and administrators with the same or lower security levels, but not vice versa. There are preferably between one and any arbitrary number of security levels. In addition to a security level, any number of controls and sub-controls can be assigned to a particular user or administrator.

Users and administrators preferably must log on to a cell communication device 110 to use it for transmitting or receiving communications or modifying its configuration or the configuration of the cell's subordinate cells. The log on process involves verification of an administrator using biometric information. For example, the administrator attempting to log on to the device 110 must submit to a retinal and/or a fingerprint scan using the device's visual/tactile interface subsystem 160. If desired, users may also be required to pass a biometric verification process to be permitted to log on to the device.

Preferably, all programming by a user or administrator of a cell communication device 110 is performed via the tactile LCD panel 165. In accordance with conventional techniques, the VTI processor 162 displays various selectable "buttons" on the tactile LCD panel 165 such as "ADD", "DELETE", "MODIFY", a 10-digit keypad, and a keyboard (i.e., alphanumeric region).

An administrator adds another administrator/user by touching the "ADD" button, or comparable action, on tactile LCD display 164 and then having the new person use the biometric devices 172, 174 so that device 110 can store that person's biometric templates in storage subsystem 150. A person preferably can only add other persons with the same or lower privilege level. For example, a "Level 3" administrator can add a "Level 4" administrator, but not vice versa.

A user can add other users with the same or lower privilege level. Further, the administrator can select from a list of controls those controls to assign to the new administrator/user. An administrator or user can modify or remove other administrators or users with the same or lower privilege level.

One of the controls an administrator might be given is called "Event Control." Event Control permits the administrator to review log file entries and decide what types of events should be logged by the cell communication device 110. More specifically, the "Event Control" privilege permits an administrator to review log entries and modify log settings. Reviewing log entries permits an administrator to look at the log file entries on the tactile LCD panel 164. Modifying the log settings permits an administrator to control what is stored in the log file. For example, all logons, either successful or failed, could be set as to be stored in the log file as noted above. As an additional example, all actions involving a control permission can also be logged.

In accordance with the preferred embodiment, the controls for implementing and maintaining the resistance cell architecture preferably includes four main controls. Those controls include Remote Control, Security Initiation Disk ("SID") Control, Node Routing Control, and Connection Control. Each of these main controls include various sub-controls.

Some of the controls and sub-controls are used by a cell administrator to configure the administrator's cell and that cell's subordinate cells. Any control or sub-control that is used by an administrator to configure a subordinate cell requires the transmission of information from the administrator's cell to the subordinate cell. The format of the transmissions between cells can be any suitable format on any type of network. For example, if the various cells of the resistance architecture are tied to the Internet, the preferred communication format is TCP/IP IP v.4. As is well known to those of ordinary skill in the art, TCP/IP-formatted communication are in the form of "packets." Each TCP/IP packet includes a TCP header, an IP header and a data payload. The headers follow the TCP and IP standards and are well known to those of ordinary skill in the art. In accordance with the preferred embodiment, command information communicated by a master cell to its subordinate cell can either be included as a value in a TCP "port" field (the TCP header includes a "source port" field and a "destination port" field), or in the TCP/IP packet payload. The TCP port field or data payload can be formatted in any suitable manner to convey the necessary commands and data.

The Remote Control preferably allows a limited control by a master cell over a subordinate cell selected by the master cell administrator. This control permits a master cell to control various aspects of a subordinate cell as described below. The master cell's cell communication device 110 maintains a list of its subordinate cells in its storage subsystem 150. Using the tactile LCD panel 164 in the visual/tactile interface subsystem 160 of the master cell's cell communication device 110, the administrator of the master cell selects a desired subordinate cell. Once a subordinate cell is selected by the master cell administrator, the following sub-controls are made available to the master cell administrator: Cell Lock/Unlock sub-control, Cell Hardware Settings sub-control, and Remote User Account Control sub-control.

The Cell Lock/Unlock sub-control permits the master cell administrator to lock or unlock the desired the selected subordinate cell. Locking the subordinate cell forces the subordinate cell to logoff any administrator currently logged on to the subordinate cell's cell communication device 110. Further, any attempt by the subordinate cell's administrator(s) to log on to the locked subordinate cell will be unsuccessful, although, if desired, the attempted but unsuccessful log on may be stored as an entry in a log file (not shown) in the subordinate cell's storage subsystem 150. By logging unsuccessful log on attempts, the subordinate cell can keep track of who has tried to log on to the locked. Unlocking a locked subordinate cell permits the subordinate cell's administrator to log on the cell.

The Cell Lock/Unlock sub-control, like all of the rest of the controls and sub-controls, cannot be blocked or ignored by the subordinate cell. In other words, the subordinate cell must lock itself if so ordered by its master cell.

The Cell Hardware Settings sub-control permits the master cell's administrator to specify the connection specifics pertaining to a subordinate cell. This sub-control itself has three sub-controls: Change Connection Hardware Settings sub-control, Change Cell Location and Range sub-control, and Change Connection Type. The Change Connection Hardware Settings sub-control lets the master cell specify what connection interface hardware the I/O subsystem 130 of the subordinate cell's cell communication device 110 is to use. Referring briefly to the I/O subsystem of FIG. 6, the master cell can use the Change Connection Hardware Setting sub-control to force the subordinate cell to use either the NIC 134, NIC 135, or modem 136 to communicate with other cells in the resistance cell network.

The Change Cell Location and Range sub-control lets the master cell specify the address or range of addresses assigned to the subordinate cell. That is, the master cell can specify the address of each of the cell communication devices in the master's subordinate cells. The specified address or address range, for example, may be an address in accordance with the TCP/IP protocols.

A range, or multiple ranges, of permissible addresses can be specified for the subordinate cell. Specifying a range of permissible addresses gives the master cell some control over a subordinate cell's ability to be physically moved. As is common with many Internet Service Providers ("ISPs"), each time a user dials in and accesses the Internet through the user's ISP, the ISP assigns a temporary IP address to that user. The next time the user dials into the ISP, he or she may be assigned a different IP address. To some degree, the IP addresses an ISP can assign to its users is based on geographical location. Thus, by limiting the range of permissible addresses, the master cell can limit, for example, the subordinate cell's access to the resistance cell architecture outside a certain geographical area, thereby providing more security to the network. If the subordinate cell attempts to access the communication medium 114 and the address assigned to the cell falls outside the range forced on the subordinate cell by its master, the subordinate cell will not permit itself to be accepted into the resistance cell architecture and no communications will be possible between that cell and all other cells to which it would otherwise be able to directly communicate.

The Change Connection Type sub-control defines whether or not the subordinate cell is "stationary" or "roaming" with respect to its address on the communications medium 114 (FIG. 3). Stationary means the subordinate cell's address remains fixed. Roaming means the subordinate cell's address may change each time the subordinate cell's cell communication device 110 accesses the communications medium 114. This may be the case, for example, for a cell that includes a laptop computer. A subordinate cell that is programmed by its master as "roaming" can also be programmed with a permissible range of addresses using the Change Cell Location and Range sub-control described above. The Change Connection Type sub-control also permits the master cell to specify whether the subordinate cell's connection is to permanent or temporary. Permanent means the subordinate cell is connected to the communications medium 114 and ready to send and receive communications from the other cells in the resistance cell architecture 24 hours per day, seven days per week. Further, the master can specify what should happen in the event a permanent-type subordinate cell is not on-line with the rest of the resistance cell architecture. For example, the master could specify that the subordinate cell be deactivated, erased, or destroyed. Temporary means the subordinate cell is only connected to and active on the communications medium 114 during certain times as specified by the master cell. This sub-control also permits the master to specify how long the communication can be ceased between the master cell and the subordinate cell without specified consequences, which could be severe such as communication device destruction or simple cell deactivation or erasure.

The Remote User Account Control sub-control allows the master cell administrator to access the User Accounts Control on the subordinate cell. This sub-control permits the administrator to view all of the user accounts associated with the subordinate cell and then select a user account. Once a user account selection is made by the master cell administrator, two sub-controls are then available to the master cell administrator. Those two sub-controls include Modify Remote User Account and Conditional Cell Lock/Unlock sub-controls.

The Modify Remote User Account sub-control permits the master cell administrator to modify the security level and control permissions assigned to the selected user account. If the user account is successfully modified, a "cascade" reaction will occur propagating the modification down through the resistance cell architecture and affecting all of the subordinate cell's subordinate cells.

The Conditional Cell Lock/Unlock sub-control allows the master cell administrator to lock or unlock the subordinate cell with respect to the specific user. Locking the subordinate cell for the specified user means that the user will not be permitted to successfully log on the subordinate cell, but the log on attempt may be logged in a log file if desired. Unlocking the subordinate cell for the selected user permits the user to log on the subordinate cell. A cascade option is available for this sub-control thereby propagating the user lock or unlock action down through the resistance cell architecture.

The Remote User Account Control sub-control includes other sub-controls including the Cell Erase, Cell Deactivate/Activate, Cell Destruct, and Event Control sub-controls. The Cell Erase sub-control permits the master cell to erase all data and settings on the subordinate cell. This sub-control, for example, will make the subordinate cell available to be used elsewhere in the resistance cell architecture. A cascade option also is available for this sub-control permitting all cells directly and indirectly subordinate to the erased cell to also be erased. Because of the severity of this action, the Cell Erase sub-control preferably is restricted to those administrators having a Level 3 security level or higher.

The Cell Deactivate/Activate sub-control permits the master cell administrator to terminate all communications to and from the subordinate cell that do not relate to the control and sub-control command structure transmissions. A Cell Lock/Unlock command, described above, will automatically follow the Cell Deactivate/Activate sub-control effectively terminating the use of the subordinate cell by any user or administrator. A cascade option is available for this sub-control forcing all subordinate cells to be deactivated.

The Cell Destruct sub-control permits the master cell to force a subordinate cell to self-destruct using the subordinate's destruction subsystem 180 described above with respect to FIG. 10. In general, a subordinate cell cannot refuse to complete a control imposed on it by its master and thus, a subordinate cannot refuse the Cell Destruct order from its master. The cell destruct sub-control preferably is only available to Level 1 administrators and also preferably requires at least three Level 1 administrators to occur in the decision to destroy the subordinate cell. This concurrence is provided by the areas level one administrators undergoing a biometric verification through the visual/tactile interface subsystem of the master cell's cell communication device 110. A destroyed cell communication device 110 precludes any communications from reaching their destination cell, if the communication necessarily needs to pass through the destroyed cell according to the particular resistance cell architecture. Further, if desired, a cascade option can be invoked resulting in the destruction of all cells directly or indirectly subordinate to the destroyed cell.

The Event Control sub-control permits the master cell administrator to control the subordinate cell's Event Control. Using the event control sub-control the master cell administrator can modify the log settings on the subordinate cell. The master cell administrator also could force the subordinate cell to synchronize its logs with the logs of the master cell. The Event Control sub-control also has a cascade option forcing all directly and indirectly connected subordinate cells to synchronize their event logs.

The SID sub-control permits the master cell administrator to control the creation and use of the SID. This sub-control includes Initiate Cell From New SID and Create SID sub-controls.

The Initiate Cell From New SID sub-control allows the master cell administrator to repair a malfunction or error in one or more cells in the resistance cell architecture. A malfunction may be a hardware or other type of problem preventing a cell communication device 110 from functioning correctly. The device 110 may need to be replaced to correct the problem. Any new device must be initiated into the resistance cell architecture using the Initiate Cell From New SID sub-control. The repair preferably begins from the highest intact and functional cell. The new cells that are subordinate to the intact cell are reconstructed using new SIDs created by their master cells using the Create SID sub-control described below. The SID will permit the subordinate cells to reestablish communication and control with the resistance cell architecture. The new SID, created by the master cell, is inserted into the removable storage device 170 of the subordinate cell to be initiated into the resistance cell architecture. When initiating the new cell, the master cell administrator preferably initializes the new SID on the master cell as well.

Once inserted into the subordinate cell, the subordinate cell detects the presence of the new SID and attempts to contact its master cell using an address stored in the SID. The various controls and sub-controls the master may place on the subordinate may be provided in the SID and retrieved by the subordinate cell or, alternatively, when the subordinate contacts its master initially, the master can transmit the controls over the communications medium 114 at that time.

The Create SID sub-control permits the master cell administrator to construct an SID that can be used to initiate a new cell into the resistance cell architecture. The Create SID sub-control requires the master cell administrator to place a disk in the removable storage device 170 of the visual/tactile interface subsystem 160 (FIG. 9) of the master cell's cell communication device 110. The master cell administrator, using the tactile LCD panel 104, stores several parameters pertaining to the new cell on the removable disk of the master cell's communication device 110. Those parameters include the new cell's hardware identifier of the NIC, the connection hardware settings, the location or range of addresses associated, the connection type and the IP address. Further, if the new cell to be initiated into the resistance cell architecture will be a master cell, the biometric and security data of the new cell's administrator is also stored on the removable disk. The removable disk then can be removed from the master cell and used as the SID for the new cell to be initiated into the resistance cell architecture.

The Cell Routing sub-control permits the master cell administrator to control the routing functions of the subordinate cell. This sub-control has three sub-controls—the Add Protocol sub-control, the Remove Protocol sub-control and the Select Protocol/Enter Local Protocol Information sub-control.

The Add Protocol sub-control allows the master cell administrator to define the characteristics and specifications of the routing protocol(s) (e.g., TCP/IP) to be used by the subordinate cell's computers or terminals coupled to the subordinate cell's cell communication device 110 (FIG. 2). In general, each cell communication device 110 can couple to multiple computers or computer networks and may need to concurrently communicate with different computers using different routing protocols. Further, some cells in the architecture may need to interface to their computers using a different routing protocol than other cells in the architecture. Each master cell can specify which routing protocol or protocols each of its subordinate cells should understand and use. This sub-control permits the master cell to dictate which routing protocols a subordinate cell will use and which protocols to which it will not respond.

In accordance with the preferred embodiment, the Add Protocol sub-control requires the master cell to include a list of instructions for the subordinate regarding a particular routing protocol. The list of instructions includes explanations of what the various fields in the protocol's routing information mean. In general, the specifications defined the master cell administrator include explanations of how to interpret the routing commands within the selected protocol. For example, one instruction may indicate what bits in the routing information for the particular protocol include the destination address. Preferably, but not necessarily, the Add Protocol sub-control is reserved for use by Level 1 Administrators only thereby requiring the highest authority within the resistance cell architecture to define the routing protocols that can be used to protect the computers participating in the resistance cell architecture. A master cell, for example, and specify that a certain cell in a highly sensitive area of the network (i.e., a cell through highly sensitive and valuable data passes and is stored) use a particular routing protocol that provides higher levels of security than other protocols. This sub-control preferably does not have a cascade option, but can if desired.

The Remove Protocol sub-control allows the master cell administrator to remove a selected routing protocol from the subordinate cell's list of available routing protocols it can use. This sub-control also has a cascade option resulting in the same routing protocol being removed from cells directly and indirectly subordinate to the target subordinate cell.

The Select Protocol/Enter Local Protocol Information sub-control allows the master cell administrator to specify the addresses or range of addresses of the computers or terminals in the subordinate cell pertaining to a particular routing protocol. Referring to FIG. 1, each cell in the exemplary resistance cell architecture has only a single computer with a single address (the numeral shown in each cell). In general, however, each cell may be coupled to multiple computers, each with an address. The master cell or the subordinate cell itself can use the Select Protocol/Enter Local Protocol Information sub-control to tell the subordinate cell which addresses are associated with the computers included in that cell. When this information is entered or modified, it preferably propagates throughout the entire resistance cell architecture so that each cell is told how to communicate with all other cells in the network. The Secured Routing Table information, discussed below, informs each cell how to route a communication for any cell in the resistance cell architecture.

The Connection Control sub-control permits the administrator or user of a cell to initiate a connection to another cell. This sub-control has two sub-controls—Connect to Master Cell and Connect to Subordinate Cell sub-controls. The Connect to Master Cell sub-control allows an administrator of a subordinate cell to connect to the subordinate cell's master cell. The Connect to Subordinate Cell sub-control allows the administrator of a master cell to connect to a selected subordinate cell.

Table I below summarizes all of the controls and sub-controls discussed above.

TABLE I

Command Structure Controls and Sub-Controls.

| Control/Sub-Control | Description |
|---|---|
| Remote Control | Allows limited control by a master cell over a selected subordinate cell |
| Cell Lock/Unlock | Lock or unlock the desired the selected subordinate cell |
| Cell Hardware Settings | Permits the master cell's administrator to define the connection specifics pertaining to the subordinate cell |
| -Change Connection Hardware Settings | Specifies connection hardware the I/O subsystem of the subordinate cell's cell communication device 110 is to use |
| -Change Cell Location/Range | Specifies the address or range of addresses of the subordinate cell |
| -Change Connection Type | Defines whether subordinate cell is stationary/roaming or permanent/temporary |
| Remote User Account Control | Allows master cell administrator to access the User Accounts Control on subordinate cell |
| -Modify Remote User Accounts | Permits master cell administrator to modify security level and control permissions assigned to selected user account |
| -Conditional Cell Lock/Unlock | Allows master cell administrator to lock or unlock subordinate cell with respect to specific user |
| -Cell Erase | Permits master cell to erase subordinate cell |
| -Cell Deactivate/Activate | Permits master cell administrator to terminate communications to and from subordinate cell not relating to control and sub-control command structure transmissions |
| -Cell Destruct | Causes subordinate cell to self-destruct |
| -Event Control | Permits master cell administrator to control the subordinate cell's Event Control |
| SID Control | Permits master cell administrator to control the creation and use of the SID |
| Initiate Cell From New SID | Allows master cell administrator to repair a malfunction or error in resistance cell architecture |

TABLE I-continued

Command Structure Controls and Sub-Controls.

| Control/Sub-Control | Description |
| --- | --- |
| Create SID | Permits master cell administrator to construct an SID that can be used to initiate a new cell into the resistance cell architecture |
| Cell Routing | Permits master cell administrator to control routing functions of subordinate cell |
| -Add Protocol | Allows master cell administrator to define the characteristics and specifications of subordinate cell's routing protocol |
| -Remove Protocol | Allows master cell administrator to remove selected routing protocol from subordinate cell |
| -Select Protocol/Enter Local Protocol Information | Allows master cell administrator to define what routing protocol addresses or address ranges pertain to subordinate cell |
| Connection Control | Permits administrator or user of a cell to initiate a connection to another cell |
| -Connect to Master Cell | Allows an administrator of subordinate cell to connect to subordinate cell's master cell |
| -Connect to Subordinate Cell | Allows administrator of master cell to connect to selected subordinate cell |

In accordance with the preferred embodiment of the invention, the resistance cell architecture includes a plurality cells that communicate with each other according to a carefully choreographed communication scheme (e.g., see FIG. 1). Although each cell in the network is aware that all of the other cells exist, each cell generally only knows the address of the cells to which it directly communicates. Referring to FIG. 1, for example, once the network is set up as shown, cell B knows that it has a computer with address 02 and the cells A, D and E have computers with addresses 01, 04, and 05, respectively. Cell B can not know, however, transmit communications to the cells containing computers with addresses 03, 06, and 07. Regarding addresses 03, 06, and 07, cell B simply knows that communications for those destination addresses must be transmitted to cell A. A Secured Routing Table stored in each cell, preferably in the cell's cell communication device 110, makes message routing throughout the network possible. The Secured Routing Table stored in a particular cell contains the addresses of the computers in the other cells in direct communication with the particular cell, and information that tells that cell where to transmit communications with the remaining computers in the network. An example is useful to explain Secured Routing Tables. The Secured Routing Table for cell B will now be explained.

Referring to FIG. 1, cell B can directly communicate with its master cell A and subordinate cells D and E. For cell B to communicate (e.g., send a data message or command) to cells C, F, and G, the communication must first be sent to cell A. If the message is intended for cells F or G, cell A must then forward the message to cell C, which in turn will forward the message to cell F or G. The Secured Routing Table for cell B contains the addresses of cells A, D and E and the addresses of the computers in cells A, D, E, and other information that informs cell B that communications intended for computers in cells C, F, and G must be sent first to cell A.

Cell A's Secured Routing Table includes the addresses of cells B and C and the computers included in cells B and C because cell A can communicate directly with those cells. The Secured Routing Table of cell A also contains information that informs cell A it must send a communication to cell B that is intended for cells D or E, and that cell A must send a communication to cell C that is intended for cells F or G. Thus, if cell B wants to send a communication to cell C, the Secured Routing Table for cell B indicates to cell B that the communication first must be transmitted to cell A. The Secured Routing Table for cell A indicates to cell A that it can communicate directly with cell C, and cell A sends the communication to cell C. The communication was transmitted from cell B to cell A to cell C with cell B only being aware that to send a communication to cell C, the communication had to pass first through cell A. Cell B gave responsibility to cell A to forward the message to the correct cell, in this case cell C.

Referring still to FIG. 1, cell B's Secured Routing Table includes the following entries: B-02, D-04, E-05, and A-0 1-03-06-07. The numbers are the addresses of the computers coupled to each cell's cell communication device. The "B-02" entry indicates that cell B has a computer at address 02. The "D-04" and "E-05" entries indicate that communications destined for computers at addresses 04 and 05 must go through cells D and E, respectively. The "A-01-03-06-07" entry indicates that communications destined for computers at any of the addresses 01, 03, 06 and 07 must go through cell A. The Secured Routing Table for cell B may also include the entries B-A, B-D, and B-E indicating that cell B can communicate directly with cells A, D and E. These entries include the address of cells A, D, and E, the cells that directly communicate with cell B.

Table II includes all of the Secured Routing Table entries for a cells in the exemplary resistance cell network shown in FIG. 1.

TABLE II

Secured Routing Table for Cells in FIG. 1.

| Cell | Addresses Associated With Other Cells | Cells in Direct Communication |
| --- | --- | --- |
| A | A-01, B-02-04-05, C-03-06-07 | A-B, A-C |
| B | B-02, D-04, E-05, A-01-03-06-07 | B-A, B-D, B-E |
| C | C-03, F-06, G-07, A-01-02-04-05 | C-A, C-F, C-G |
| D | D-04, B-01-02-03-05-06-07 | D-B |
| E | E-05, B-01-02-03-04-06-07 | E-B |
| F | F-06, C-01-02-03-04-05-07 | F-C |
| G | G-07, C-01-02-03-04-05-06 | G-C |

The following discussion describes a preferred method, although not the only method, for initializing a resistance cell network and creating the secured routing table information stored in each cell. Several principles are applied in creating or modifying the resistance cell architecture. For example, each time a cell changes its secured routing table (either creates it for the first time or changes or adds information to the able), the new routing information is propagated to the rest of the network. A cell whose routing table changes first attempts to communicate the new information to its subordinates, if it has any subordinates. Then, the cell communicates the new information to its master cell. This process is repeated until the secured routing tables in all of the cells are updated indicated by a cell receiving routing information from another cell that does not warrant a change to its existing table.

The network shown in FIG. 1 can be created starting with cell A. The administrator for cell A creates an SID to be used to initiate subordinate cell B into the network. Once initiated, told that cell A is its master, and that computer at address 02 is part of its cell, cell B creates its secured routing table. The table at this point includes the entries B-02 to indicate address 02 is associated with cell B and A-01 to indicate address 01 is associated with cell A. If cell B had any subordinate cells, cell B would communicate its routing information to the subordinate cells. Not having any subordinate at this point, however, cell B then communicates its entries to its master, cell A. Cell A thus is provided the routing information B-02. This entry indicates to cell A that all communications destined for address 02 are to be transmitted to cell B. If master cell A already had the entry B-02 in its routing table (which may be the case if cell A informed cell B that cell B had address 02), then cell A does not need to update its routing table and the process routing table update process ends.

If, however, cell A did not already have B-02 in its routing table, then B-02 is added to the table. Because cell A's routing table changed, cell A then attempts to communicate the new information (B-02) to any other subordinate cell it has (in this case cell A has no subordinate besides cell B at this point). Because cell A has no other cells to communicate the new routing information to, the routing update process ends.

The process is repeated for other cells that are initiated into the network. For example, when cell B initiates subordinate cell D, by using an appropriate SID, cell D creates its initial secured routing table which has the entries B-02 and D-04. Cell D then determines whether it has any subordinate cells. If there are any subordinates, the entry D-01-02-04 would be communicated to such subordinates to indicate that all communications for addresses 01, 02, and 04 must be transmitted to cell D. Not having a subordinate cell, however, cell D then communicates the routing information D-04 to its master, cell B. Cell B updates its routing table to include the entry D-04 to indicate that communications for address 04 must be transmitted to cell D. After updating its routing table, cell B transmits the updated routing information to any other subordinate cells tied to cell B. Not having yet initiated cell E at this point, cell B then communicates the new routing information, B-02-04, to its master, cell A, to indicate that all communications from cell A that are destined for address 02 or 04 must be transmitted by cell A to cell B. Cell A updates its secured routing table with the new entry and communicates the new information to any other subordinate cell it has. Cell A's routing table at this point includes the entries A-01 and B-02-04.

By way of one additional example, cell A may now initiate cell C into the network. Once initiated, cell C creates its secured routing table having the entries C-03 and A-01-02-04, which is provided by cell A. Cell C looks for its subordinates, and, not having any subordinate cells at this point, communicates the routing information C-03 to cell A. Cell A, in turn, adds the entry C-03 to its routing table, and communicates the routing information A-03 to cell B to indicate to cell B that all communications from cell B destined for address 03 must be transmitted to cell A. Cell B updates its routing table to include the routing entry A-03 and communicates the routing information B-03 to its subordinate, cell D, to indicate t hat all communicates from cell D destined for address 03 must first be transmitted to cell B. Cell D then updates its routing table with the entry B-03.

This routing information update process is repeated each time a new cell is initiated into the network or an administrator changes the routing directions for an existing cell.

The resistance cell architecture described above provides a quick and effective way to isolate security problems and intrusions into a computer network. Each cell in the network is only permitted to communicate directly with certain, and indirectly with other cells through the cells in direct communication with the particular cell. This structure also makes it more difficult for an unauthorized entity to access the entire network by accessing a single cell. Many cells in the network act as masters of other cells and, as masters, control many functions and the communication behavior of the subordinate cells.

The above discussion is meant to be illustrative of the principles of the present invention. Numerous variations and modifications will become apparent to those skilled in the art once the above disclosure is fully appreciated. It is intended that the following claims be interpreted to embrace all such variations and modifications.

What is claimed is:

1. A resistance cell architecture, comprising:
 a plurality of cells in communication with one another over a communications medium, each cell having an associated address and capable of communicating directly with some, but not all cells, each cell aware of the addresses of only those cells to which the cell can directly communicate and not aware of the addresses of all other cells, each cell comprising:
 an interface coupled to the communications medium;
 memory containing routing data, said routing data comprising (a) the addresses of the cells that the cell is aware the cell can communicate directly with and (b) information as to how the cell is to communicate with all other cells of which it cannot communicate directly with; and
 a processor coupled to said interface and said memory, said processor reading said routing data from said memory to determine the address of a cell to which a communication is to be transmitted;
 wherein each cell is initiated into the resistance cell architecture according to an initiation process in which the cell receives an initiation storage device containing an address of another cell and establishes communication with such other cell.

2. The resistance cell architecture of claim 1 wherein the communications medium includes a publicly-available network.

3. The resistance cell architecture of claim 1 wherein the communications medium includes the Internet.

4. The resistance cell architecture of claim 1 wherein some of the cells cause other cells to execute preprogrammed commands.

5. A method of transmitting a communication on a network of cells, comprising:
 (a) in a new cell, receiving a security initiation device containing the address of a cell;
 (b) initiating the new cell into the network using information contained on the security initiation device and not permitting the new cell to access the network until the cell has successfully communicated with the cell whose address is on the security initiation device;
 (c) determining the address of the destination cell of the communication;
 (d) looking up in a routing table to determine where to transmit the communication so that the communication will eventually be transmitted to the destination cell; and
 (e) transmitting the communication to a cell address determined from the routing table.

6. The method of claim 5 wherein the routing table of each cell includes addresses of other cells that are in direct communication with the cell, and addresses of cells in direct communication with the cell through which communications must be transmitted to go to cells not in direct communication with the cell.

7. The method of claim 5 wherein step (e) includes transmitting the communication to a cell that then forwards the communication to the destination cell.

8. The method of claim 5 wherein step (e) includes transmitting the communication to a cell that then looks up in a routing table to determine where to transmit the communication so that the communication will eventually be transmitted to the destination cell.

9. The method of claim 5 further including creating a routing table in each cell, each routing table determining which cells are in direct communication with the cell and to which cells communications should be transmitted that are destined for cells not in direct communication with the cell.

10. The resistance cell architecture of claim 1 wherein the initiation storage device contains biometric information.

11. The resistance cell architecture of claim 1 wherein at least one cell comprises a destruction subsystem that can destroy at least a portion of at least one cell on command from another cell.

12. The resistance cell architecture of claim 11 wherein at least one cell comprises a capacitor that can be charged to provide a power surge to at least a portion of at least one cell to thereby destroy such portion of the cell on command from another cell.

13. The resistance cell architecture of claim 1 wherein a cell is used to initiate another cell into the resistance cell architecture by creating the initiation storage device and programming the initiation storage device to contain the address of the cell being used to create the initiation storage device and biometric information.

14. The resistance cell architecture of claim 1 wherein a cell cannot be used in the resistance cell architecture without having received the initiation storage device and establishing communication with the other cell.

15. The resistance cell architecture of claim 1 wherein at least one of the plurality of cells defines a routing protocol to be implemented by another of the cells.

16. The resistance cell architecture of claim 1 wherein at least one of the plurality of cells defines a routing protocol address or range of addresses pertaining to another of the cells.

17. The resistance cell architecture of claim 4 wherein the preprogrammed commands comprise a lock command that causes a cell to log off any currently logged on network administrator and prevent any further attempts of the network administrator to log on to the cell.

* * * * *